US011236897B2

(12) United States Patent
Greiner et al.

(10) Patent No.: US 11,236,897 B2
(45) Date of Patent: Feb. 1, 2022

(54) INTERACTIVE IMAGING AND SENSING SYSTEM, DEVICE AND METHOD

(71) Applicant: Design Mill Inc., Dubuque, IA (US)

(72) Inventors: Nathan L. Greiner, Hanover, IA (US); Alexander Jon Schuster, Dubuque, IA (US); Jane McCleary, Cuba City, WI (US); Jasmine Nobis-Olson, Elizabeth, IL (US); John Brian Priest, Dubuque, IA (US)

(73) Assignee: Design Mill Inc., Dubuque, IA (US)

( * ) Notice: Subject to any disclaimer, the term of this patent is extended or adjusted under 35 U.S.C. 154(b) by 0 days.

(21) Appl. No.: 16/882,659

(22) Filed: May 25, 2020

(65) Prior Publication Data

US 2020/0284416 A1 Sep. 10, 2020

Related U.S. Application Data

(63) Continuation-in-part of application No. 16/132,929, filed on Sep. 17, 2018, now Pat. No. 10,665,068, which is a continuation of application No. PCT/US2017/022970, filed on Mar. 17, 2017.

(60) Provisional application No. 62/309,737, filed on Mar. 17, 2016.

(51) Int. Cl.
A63B 22/02 (2006.01)
F21V 23/04 (2006.01)
F21Y 115/10 (2016.01)
A63B 71/00 (2006.01)

(52) U.S. Cl.
CPC .......... F21V 23/0478 (2013.01); A63B 22/02 (2013.01); A63B 2071/009 (2013.01); F21Y 2115/10 (2016.08)

(58) Field of Classification Search
None
See application file for complete search history.

(56) References Cited

U.S. PATENT DOCUMENTS

| 4,365,237 | A | | 12/1982 | Knight |
| 4,812,827 | A | | 3/1989 | Scripps |
| 5,798,931 | A | * | 8/1998 | Kaehler ............... G06Q 20/209 700/231 |
| 6,058,986 | A | * | 5/2000 | Bethuy ............... B67D 1/1238 137/392 |
| 6,696,971 | B2 | | 2/2004 | Tukin |
| 6,933,854 | B1 | | 8/2005 | Burgess |
| 6,956,493 | B1 | | 10/2005 | Youngblood |
| 7,817,016 | B2 | | 10/2010 | Haase |
| 10,089,778 | B2 | | 10/2018 | Moule et al. |
| 2011/0007227 | A1 | | 1/2011 | Yonishi |
| 2011/0288964 | A1 | | 11/2011 | Linder et al. |
| 2011/0292036 | A1 | | 12/2011 | Sali et al. |
| 2012/0050701 | A1 | | 3/2012 | Wang |
| 2012/0169507 | A1 | | 7/2012 | Dyer et al. |

(Continued)

FOREIGN PATENT DOCUMENTS

DE 19525843 5/1998
WO WO2105036852 3/2015

Primary Examiner — Brent Swarthout
(74) Attorney, Agent, or Firm — Rathe Lindenbaum LLP

(57) ABSTRACT

An order to customer linking system may include a sensor to sense a position of an order, a projector and a processing unit to associate a customer with the order and to output signals causing the projector to project a customer identification image based upon the position.

6 Claims, 22 Drawing Sheets

(56) References Cited

U.S. PATENT DOCUMENTS

| | | | |
|---|---|---|---|
| 2013/0303338 A1 | 11/2013 | Tseng et al. | |
| 2015/0222842 A1 | 8/2015 | Kwong | |
| 2015/0379650 A1* | 12/2015 | Theobald | H04W 4/80 |
| | | | 705/15 |
| 2018/0249861 A1* | 9/2018 | Hiatt | A23L 5/10 |
| 2019/0279181 A1* | 9/2019 | Kelly | G06Q 20/202 |
| 2020/0143494 A1* | 5/2020 | Hasty | G08B 3/10 |
| 2020/0255277 A1* | 8/2020 | Stubbs | G07F 13/065 |
| 2020/0387912 A1* | 12/2020 | Allen | G06K 9/00288 |

* cited by examiner

```
100
```

| 102 |
|---|
| Project a projection field onto and about a modifiable medium |

↓

| 104 |
|---|
| Sense a three dimensional sensing field containing the projection field and the modifiable medium |

↓

| 110 |
|---|
| Receive input from an input interface outside the projection field and the sensing field |

↓

| 120 |
|---|
| Adjust the projection field based on the sensed three dimensional field and the input |

INTERACTIVE IMAGING AND SENSING SYSTEM, DEVICE AND METHOD

CROSS-REFERENCE TO RELATED PATENT APPLICATIONS

The present continuation-in-part application claims the benefit of and priority from U.S. patent application Ser. No. 16/132,929, now U.S. Pat. No. 10,665,068, filed on Sep. 17, 2018 which was a continuation of PCT patent application PCT PCT-US17/22970 filed on Mar. 17, 2017 by Greiner et al. and entitled INTERACTIVE IMAGING AND SENSING SYSTEM, DEVICE AND METHOD, which claimed priority from U.S. Patent Provisional Application Ser. No. 62/309,737 filed on Mar. 17, 2016 by Greiner et al. and entitled INTERACTIVE IMAGING AND SENSING SYSTEM, DEVICE AND METHOD, the full disclosures each of which are hereby incorporated by reference.

BACKGROUND

Projectors are generally utilized to project an image onto a wall. The projector is generally controlled through manual input of commands.

DETAILED DESCRIPTION OF EXAMPLES

Figures 1, 2:
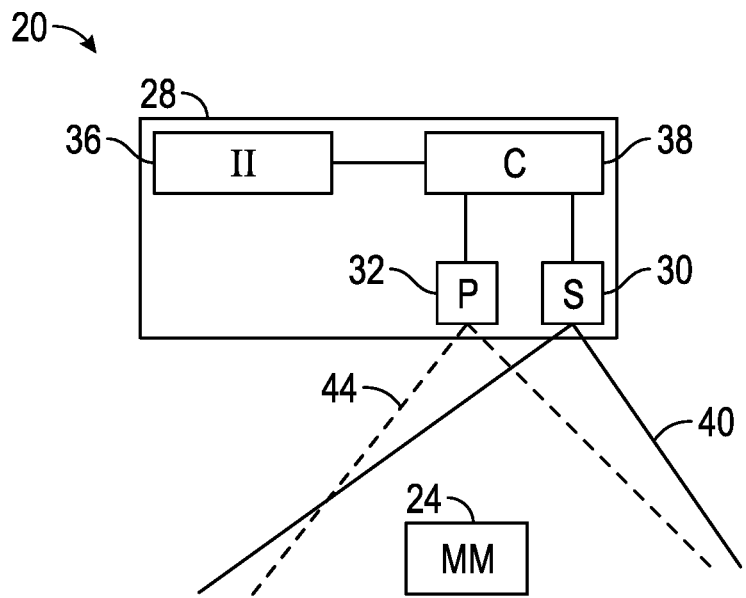
FIG. 1 is a schematic diagram of an example interactive sensing and imaging system.
FIG. 2 is a flow diagram of an example interactive sensing and imaging method.

FIG. 1 schematically illustrates an example interactive sensing and imaging system 20. System 20 provides a visible image, wherein system 20 utilizes a three dimensionally sensed modifiable medium 24 as an input which, at least in part, controls or impacts the visible image being provided. The modifiable medium 24 may comprise any of a variety of different mediums, structures, particulates, objects, animals, figurines, persons, and the like which are modifiable, either in size, shape, color, orientation, position or the like. In one implementation, modifiable medium 24 comprises a person.

In one implementation, modifiable medium 24 may comprise a moldable medium. For purposes of this disclosure, a moldable medium comprises a medium of tens, hundreds, thousands or more of individual elements or particles which may cling or adhere to one another without interlocking connectors, and which may be manually manipulated to change shape, wherein the medium subsequently retains its shape or form. Examples of moldable mediums comprise sand, clay, soil or other particulates.

In another implementation, modifiable medium 24 may comprise a physical object which may be manually lifted, rotated, reoriented or relocated. In one implementation, modifiable medium 24 may comprise a powered object that propels itself or that is propelled pursuant to control signals from a remote controller. For example, one implementation, modifiable medium 24 may comprise a battery powered toy figurine, robot, toy car, truck or other vehicle. In one implementation, the battery powered toy figurine, robot, toy car, truck or other vehicle may be remotely controlled in a wired or wireless fashion.

In one implementation, modifiable medium may comprise an assembly of interconnectable construction or building elements, wherein the different elements are releasably or removably connected to one another interconnecting or interlocking structures. For purposes of this disclosure, the term "releasably" or "removably" with respect to an attachment or coupling of two structures means that the two structures may be repeatedly connected and disconnected to and from one another without material damage to either of the two structures or their functioning. For example, modifiable medium may comprise interconnecting building blocks or components such as LEGOS building bricks and other interconnectable components, TINKER toy construction set components, LINCOLN LOG construction set components, K'NEX construction toy system components and the like.

In one implementation, modifiable medium comprises a multitude of such different mediums. For example, modifiable medium 24 may comprise both a moldable medium as described above and multiple different other modifiable mediums, such as figurines, powered vehicles, toys, articles or the like resting upon or buried within the moldable medium. For example, in one implementation, the moldable medium may provide an undulating terrain for the other modifiable mediums, wherein the train may be manually changed.

In addition to modifiable medium 24, system 20 further comprises imaging and sensing device 28. Device 28 interacts with modifiable medium 24 by forming a three-dimensional measurement sensing field 40 over, onto and about modifiable medium 24. The sensed three-dimensional measurements of modifiable medium 24 are used by device 28 to modify the image being provided. In the example illustrated, the image comprises a projection field 44 which extends over, onto and about modifiable medium 24. Device 28 comprises sensor 30, projector 32, input interface 36 and controller 38.

Sensor 30 comprises a three-dimensional sensor that forms the three-dimensional measurement sensing field 40 over and about modifiable medium 24. In the example illustrated, sensor 30 is provided as part of the same device 28 (supported by the same framework, housing or bracket) as projector 32. In other implementations, sensor 30 may be a separate component independent of the structure housing or supporting projector 32, wherein sensors 30 communicates with controller 38. In some implementations, sensor 30 may comprise multiple three-dimensional sensors. In one implementation, sensor 30 comprises a RealSense™ camera, commercially available from INTEL. In other implementations, sensor 30 may comprise other existing or future developed three-dimensional sensors.

Projector 32 comprise at least one optical device that projects an image (or moving images) onto a surface, such as onto exterior surfaces of modifiable member 24 as well as any other additional surfaces underline, supporting or extending about modifiable member 24. Projector 32 provides a projection field 44 which may include pictures, photos, graphics, grids, designs or any other visual presentation. In the example illustrated, projection field 44 is contained within sensing field 40 such that any structures within projection field 44, such as modifiable medium 24, are also within sensing field 40. In other implementations, sensing field 40 and projection field 44 may partially overlap one another. In still other implementations, projection field 44 may be larger than and may contain sensing field 40, wherein sensing field 40 is directed on a distinct selected portion of the projection field 44 and any modifiable mediums 24 contained within the projection field 44.

In one implementation, projector 32 comprises a video projector such as a liquid crystal diode (LCD) projector. In yet other implementations, projector 32 comprises a cathode ray tube (CRT) projector. In still other implementations, projector 32 may comprise light emitting diode (LED projector) or a digital light processing (DLP) projector). In some implementations, projector 32 may comprise a laser projector. In one implementation, projector 32 may comprise the two dimensional projector. In another implementation projector 32 may comprise a three-dimensional or holographic projector. In one implementation, projector 32 may comprise a 3D projector that works for passive and active stereoscopic viewing with appropriate glasses, facilitating 3D (stereo viewing).

Input interface 36 comprises a device outside of either sensing field 40 of projection field 44 by which a person may enter or provide commands, selections, choices or other input to controller 38. In one implementation, input interface 36 comprises a pushbutton or slider bar. In another implementation, input interface 36 comprises a joystick. In yet other implementations, input interface 36 comprises a microphone with associated speech recognition software, a touchpad, a keypad, a keyboard, a mouse, a stylus and pad or other input mechanisms. In yet other implementations, input interface 36 may comprise a wired or wireless transceiver to facilitate the provision of commands, selections, choices or other input to controller 38. For example, one implementation, input interface 36 may facilitate communication with an interactive monitor/display, such as a tabletop electronic device, or a portable electronic device such as a notebook or laptop computer, tablet computer, smart phone or smart watch. In one implementation, input interface 36 may facilitate near field communication, such as Bluetooth, with a separate device, such as a separate or remote electronic device or interactive monitor/display.

Controller 38 comprises a processing unit that receives input from sensor 30 and input interface 36 and utilizes such input to control and adjust the output of projector 32, the configuration or the contents of projection field 44. For purposes of this application, the term "processing unit" shall mean a presently developed or future developed electronics or processing hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 38 may be embodied as part of one or more application-specific integrated circuits (ASICs). Unless otherwise specifically noted, the controller is not limited to any specific combination of hardware circuitry and software, nor to any particular source for the instructions executed by the processing unit.

In the example illustrated, controller 38 follows instructions contained within a non-transitory computer-readable medium to carry out method 100 in FIG. 2. Although method 100 is described as being carried out by system 20 for ease of discussion, method 100 may also be carried out by any of the interactive sensing and imaging systems described hereafter. As indicated by block 102, controller 38 outputs control signals directing projector 32 to project projection field 44 onto an about modifiable medium 24. The projection field comprising overall image which may comprise text, two-dimensional images, three-dimensional images or holographs. For example, projection field 44 may comprise an environment or terrain about modifiable medium 24. Such an environment may comprise an image of water, vegetation, buildings, bunkers and the like. In one implementation, modifiable medium 24 may comprise a moldable medium to provide elevational changes in the medium, wherein projection field 44 provides a projected cover of vegetation, water or the like on top of the modifiable medium. Examples of vegetation include brush, grass, trees or any other growth. In such an implementation, modifiable medium 24 make comprise a vehicle, person, animal or other object which may be driven, repositioned or the like at various locations on the projected environment or terrain. In some implementations, projection field 44 may additionally or alternatively comprise other objects, other vehicles, images of persons, animals, plants and the like.

The projection field 44 may breathe imagination and life onto modifiable medium 24 and about modifiable medium 24. For example, in one implementation, modifiable medium 24 may comprise a first modifiable medium comprising a moldable medium and a second modifiable medium comprising a vehicle, wherein projection field 44 projects vegetation, roads, buildings, rivers, lakes, buildings, other vehicles, monsters, castles, armies or other imaginative objects or structures onto the moldable medium, wherein the vehicle may be moved come either manually or under the power of motor, over top of the first modifiable medium, over the projected roads, and relative to the projected monsters, castles, armies or other imaginative objects or structures. The objects being projected may be controlled so as to interact with the second modifiable medium 24. Other vehicles, monsters, animals and the like may be projected so as to interact with the first modifiable medium. For example, a projected rhinoceros made the projected so as to charge the second modifiable medium, the vehicle, wherein the person may desire to move the vehicle to avoid the charging rhinoceros. By way of another example, the projection may comprise both a road and other vehicles in a race with the first modifiable member, the vehicle.

In one implementation in which modifiable member 24 comprises interlocking or interconnectable building elements, such as LEGOS building components, projection field 44 may project colors, surface treatments, shingles, textures or the like over and onto the assembled building elements. Projection field 44 may comprise other structures or objects about the assembled building elements such as roads, sidewalks, trees and the like. In such an implementation, projection field 44 may also project other animals, persons, vehicles or structures which interact with the assembled building elements.

As indicated by block 104 of FIG. 2, controller 38 further outputs control signals directing sensor 30 to sense a three-dimensional sensing field 40 and to receive signals from sensor 30 indicating three-dimensional measurements of modifiable mediums that objects within field 40. The sensing field 40 contains the projection field and the modifiable medium 24. Sensing field 40 comprises the three dimensional volume which is sensed by sensor 30. Sensor 30 senses and measures three-dimensional measurements or dimensions of modifiable medium 24. Sensor 30 detects any modification of modifiable medium 24, such as a change in shape, location, size or color of modifiable medium 24. Sensor 30 provides sensing to facilitate distinguishing between different modifiable mediums 24 within sensing field 44.

As indicated by block 110 in FIG. 2, controller 38 further receives input from input interface 36 which is outside the projection field 44 and outside the sensing field 40. For example, controller 38 may receive signals from a handheld game controller, which does not control any changes in modifiable medium 24, but impact the presentation of projection field 44.

As indicated by block 120, controller 38 outputs control signals adjusting projection field 44 based upon both the three dimensional field 40 and input from input interface 36. For example, in one implementation, modifiable member 24 may comprise a physical tank and input interface 36 may comprise a manual handheld controller. In response to manual or powered repositioning of the tank, as sensed by sensor 30, controller 38 may output control signals causing projector 32 to change projection field 44 to alter the projected terrain. In response to a person depressing a fire button on the manual controller (serving as input interface 36), controller 38 may output control signals causing projector 32 to project an artillery shell moving from the physical tank (modifiable medium 24), to project an explosion of the artillery shell and may further change the previously projected building, vegetation or the like to reflect changes in the building, vegetation or the like brought about by the explosion of the artillery shell. The direction in which the projected artillery moves may be dependent upon the direction input by the input interface 36. As will be described hereafter, controller 38 may alter the contents of projection field 44 in numerous fashions based upon sensed changes within three-dimensional sensing field 40 for multiple different purposes, other than games.

Figure 3:
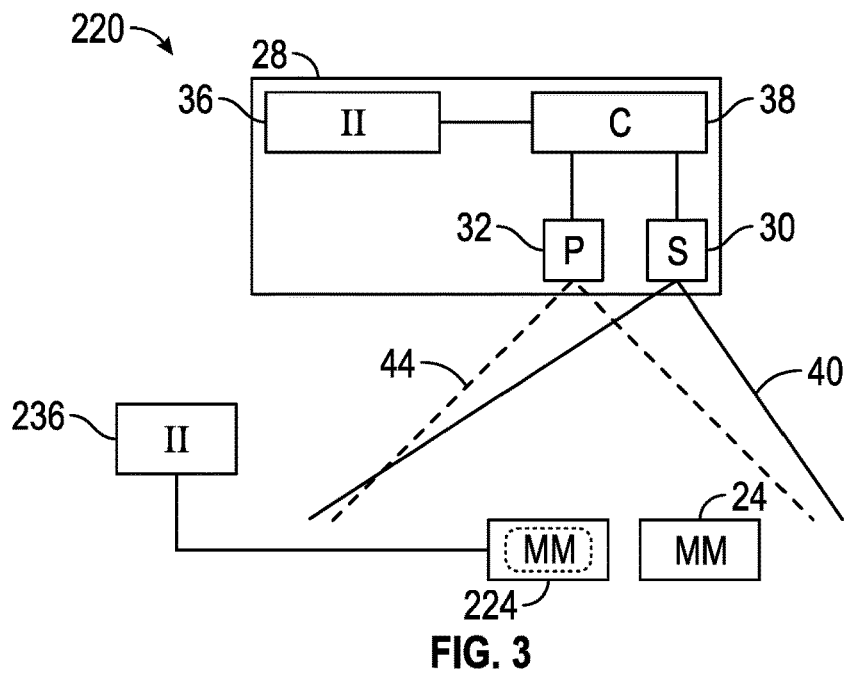
FIG. 3 is a schematic diagram of another example interactive sensing and imaging system.

FIG. 3 schematically illustrates an example interactive imaging and sensing system 220, another example implementation of system 20. System 220 is similar to system 20 except that system 220 additionally comprises modifiable medium 224 and input interface 236. Those remaining components of system 220 which correspond to once of system 20 are numbered similarly and are described above with respect to system 20.

Modifiable medium 224 is similar to modifiable medium 24 described above except that modifiable medium 224 is modifiable under the control or direction of input interface 236. As schematically illustrated, modifiable medium 224 may be changed from a first state and/or position shown in broken lines to a second different state and fact or position shown in solid lines. The change in state may be a change in size, shape, color or other configuration. For example, in one implementation, modifiable medium 224 may comprise a powered vehicle, robot, figurine or other object which moves, propels objects or changes its configuration or shape in response to signals from input interface 236. In one implementation, modifiable medium 224 may comprise a moldable medium and associated shovels, baffles or other structures, wherein the shovels, baffles or other structures move in response to signals from input interface 236, wherein the shovels, baffles or other structures change the configuration or move the moldable medium. In one implementation, the modifiable medium may comprise ferromagnetic structures which are actuated or which are moved in response to changing magnetic fields. In one implementation, modifiable medium 224 may comprise a basin of liquid, wherein baffles or other structures, in response to signals from input interface 236, make waves or cause flow of the liquid serving as modifiable medium 224.

Input interface 236 is similar to input interface 36 described above except that rather than providing input or signals to controller 38, input interface 236 provide signals or inputs directly to modifiable medium 224 (or structures that alter the shape of modifiable medium 224, such as the baffles described above). As with input interface 36, input interface 236 is outside of sensing field 40 and projection field 44. In one implementation, input interface 236 has a transceiver which communicates with a corresponding transceiver of modifiable medium 224. In one implementation, such communication is wireless, such as through radiofrequency signals, optical signals such as infrared signals, or other wireless forms of communication. In one implementation, input interface 236 communicates wirelessly with a network server, wherein the network server relay such communication to modifiable medium 224, which is also in wireless communication with the network. In another implementation, input interface 236 communicates with modifiable medium 224 in a wired fashion. In one implementation, input interface 236 may control the magnetic member to move the magnetic member or alter its exerted magnetic fields so as to move or otherwise change modifiable member 224 which magnetically interacts with the magnetic member.

Figure 4:
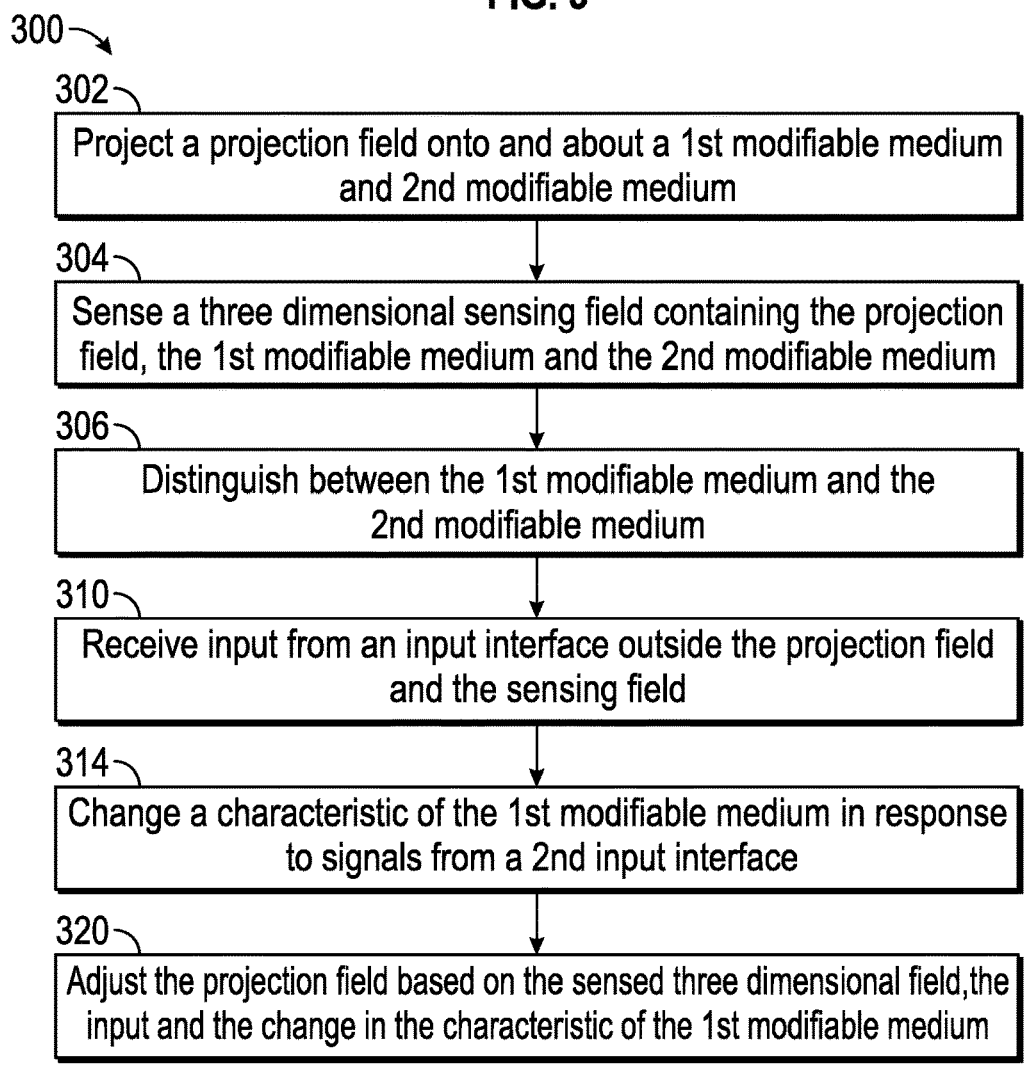
FIG. 4 is a flow diagram of another example interactive sensing and imaging method.

System 220 may carry out the interaction method 300 illustrated in FIG. 4. Although method 300 is illustrated as being carried out by system 220, method 300 may be carried out by any of the appropriately configured described systems. As indicated by block 302, controller 38 outputs control signals directing projector 32 to project projection field 44 onto an about modifiable medium 24 and modifiable medium 224. Projection field 44 is described above.

As indicated by block 304, controller 38 outputs control signals directing sensor 30 to sense a three-dimensional sensing field 40 which contains projection field 44, modifiable medium 24 and modifiable medium 224. Sensing field 40 is described above. As indicated by block 306, controller 38 utilizes the signals received from sensor 32 distinguish between modifiable medium 24 and modifiable medium 224. As indicated by block 310, controller 38 further receives input from input interface 36, similar to block 110 described above with respect to method 100.

As indicated by block 314, in response to receiving signals from input interface 236, modifiable medium 224 changes at least one characteristic. As described above, the characteristic may be a positioning of modifiable medium 224 or a configuration of modifiable medium 224, such as size, shape, color or the like.

As indicated by block 320, controller 38 adjusts the content of projection field 44 based upon input received from input interface 36, and the sensed characteristics of modifiable medium 24 and modifiable medium 224 is sensed by sensor 30 within sensing field 40. The signals from input interface 236 produce changes to the configuration and/or positioning of modifiable member 224. Such changes are sensed by sensor 30 which results in controller 38 further adjusting or modifying the content of projection field 44. For example, in one implementation, signals from input interface 236 may actuate a motor or other propulsion unit of modifiable member 224 and cause modifiable medium 224, a vehicle, to move from the first location to a second location. The changes in location of medium 224 are sensed by sensor 30 which results in controller 38 adjusting the projected road, vegetation or terrain of field 44. In one implementation, signals from input interface 236 may cause modifiable member 224 to change shape or configuration. For example, in one implementation where the modifiable member comprises a military tank, signals from input interface 226 may cause a canon of the tank to rise. The raising of the canon is sensed by sensor 30 which causes controller 38 to output control signals directing processor 32 to project the firing of an artillery shell from the raised cannon.

Figure 5:
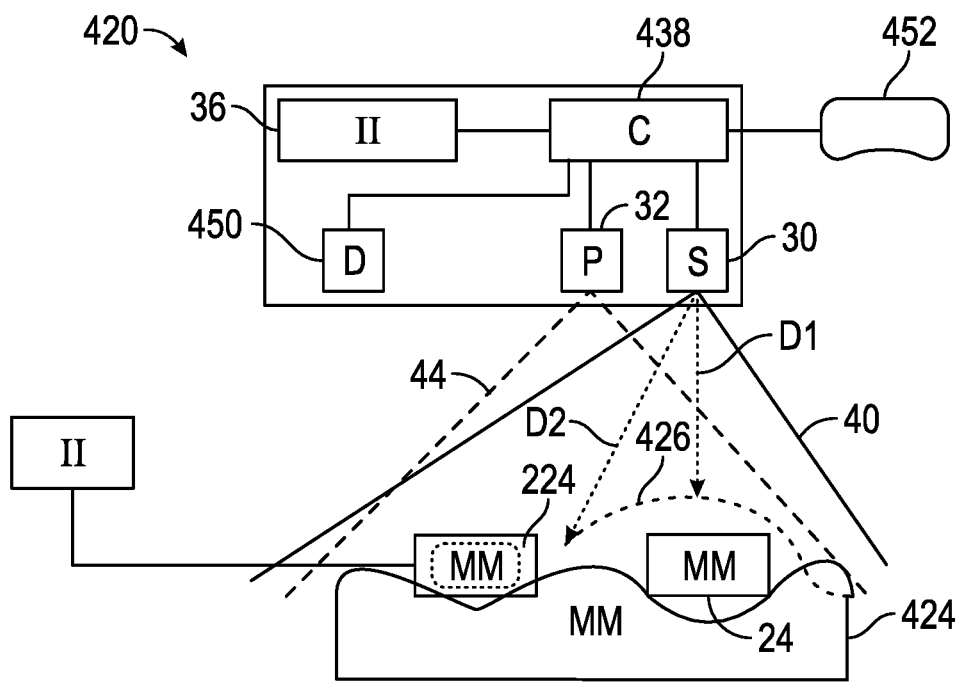
FIG. 5 is a schematic diagram of another example interactive sensing and imaging system.

FIG. 5 schematically illustrates interactive imaging and sensing system 420, another example implementation of system 20. System 420 is similar to system 320 described above except that system 420 additionally comprises modifiable member 424, display 450 and augmented virtual reality optics 452. System 420 additionally comprises controller 438 in lieu of controller 38. Those remaining components or elements of system 420 which correspond to components or elements of system 320 are numbered similarly and are described above with respect to system 320.

Modifiable medium 424 comprises a moldable medium upon which modifiable mediums 24 and 224 rest. In some implementations, modifiable medium 424 may cover one or both of mediums 24, 224, wherein mediums 24, 224 may be buried or underlie the upper surface of medium 424. In one implementation, modifiable medium 424 comprises sand. As indicated by broken lines 426, modifiable medium 424 main be molded or shaped to have different undulations, different hills, valleys, or terrain heights. In some implementation, modifiable medium 424 may cover one of mediums 24, 224 as illustrated. As a result, a person may selectively shape medium 424 to provide mountains, hills, valleys, lakes, and the like for mediums 24, 224. Such changes in the shape of modifiable medium 424 are detected by sensor 30. In response to such detected changes, controller 38 may output control signals to projector 32 causing projector 32 to change the contents of the projected image 44. For example, in response to modifiable medium 424 being shaped into a mountain, extending above predetermined height threshold, controller 438 may cause projector 32 to project whites on top of those portions of modifiable medium 424 extending above the predefined height threshold. In response to modifiable medium 424 being dug into to a depth below a predefined threshold, controller 438 may cause projector 32 to project water within the gorge, valley or basin extending below the predefined depth. In some implementations, in response to sensor 30 detecting the removal or shifting of medium 424 from a predetermined location such that the upper surface of medium 424 at the predetermined location exceeds a predetermined depth, controller 438 may output control signals causing projector 32 to project a newly "exposed" object, structure or material, the new object or structure being previously "buried" within modify medium 424 until such digging in modifiable medium 424 exposed the previously buried and now projected object, structure or material.

As described above, the sensed shifting of modify medium 424 may result in additional changes to the content of projection field 44. For example, previously displayed vegetation may be removed or be projected as being damaged in response to such digging. Such shifting of modify medium 424 may result in the repositioning of either of members 24, 224 may further result in changes to the content of projection field 44.

Display 450 comprises a display screen or panel. In one implementation, display 50 is contained within projection field 44 and supplements projection field 44. In another implementation, display 50 is outside of projection field 44 in one implementation, controller 438 further alters the content of display 450 based upon signals from sensor 30 as well as signals from input interface 36. In one implementation, controller 438 generates and presents virtual objects on display 450 which correspond to one or more of movable medium 24, 224, 424. Such virtual objects may be identical to the actual configuration of the modifiable mediums or may be based upon, but not identically correspond to the modifiable mediums. For example, modifiable medium 224 may comprise a tank having a first level of detail, wherein controller 38 generates and presents a virtual tank on display 450, wherein the virtual tank corresponds to the real world physical tank in location and orientation, but wherein the virtual tank has a different color or combination of colors, a second much greater level of detail or additional features. In such an implementation, movement of movable medium 224, comprising the real world physical tank, resulting corresponding or proportional movement of the virtual tank being displayed on display 450.

In such an implementation, controller 38 may also generate and present a virtual terrain, underlying the virtual tank, on display 450, wherein the virtual train corresponds to the configuration of modifiable medium 424. For example, a person may manually shift the sand or other moldable medium of modifiable medium 424 which results in the virtual terrain presented on display 50 also correspondingly changing. In one implementation, controller 438 may output control signals causing display 450 to visibly present a perspective of a modifiable medium, wherein the perspective changes depending upon the physical orientation or positioning of the modifiable. For example, in one implementation, the location and orientation of modifiable medium 224 is sensed by sensor 30. Based upon the sensed information, controller 438 may cause display 450 to present a view, taken from a height of modifiable medium 224, wherein the view will vary depending upon the position of modifiable medium 224 and the direction in which modifiable medium 224 is pointed.

By way of example, in implementations where modifiable medium 224 comprises a tank, display 450 may present a view from a perspective of a tank driver in a cockpit of the tank. Display 450 may present a hypothetical screen or window as would be seen by an operator of the tank within a cockpit of the tank, the screen including targeting information. In such implementations, display 450 allows different views or perspectives, at the level of the train provided by modifiable medium 424 and depended upon the position and orientation of the corresponding modifiable medium 224, allowing a person utilizing system 420 to position himself or herself, virtually, in or with modifiable medium 224. In some implementations, display 450 may be omitted.

Virtual-reality optics 452 comprise optics which permit viewing through the optics, but which add additional virtual objects in the viewed content. For example, virtual-reality optics 452 may comprise virtual-reality headsets, glasses, helmets or the like. Virtual-reality optics 452 communicate with controller 38 in a wired or wireless fashion through corresponding transceivers. When virtual-reality optics 452 are utilized with or as part of system 420, controller 438 controls the virtual content on optics 452 based in part upon signals from sensor 30 as well as signals from input interface 36. In one implementation, controller 38 controls optics 452 to present additional objects or images upon optics 452, wherein the object or images change in response to changes in the shape of modifiable medium 424 is sensed by sensor 30 or changes in the shape and size or positioning of either of modifiable mediums 24, 224.

In one implementation, controller 38 controls optics 452 to present virtual overlays on top of the real world physical objects, such as modifiable mediums 24 or 224, wherein the overlays may be smaller than the corresponding movable medium 24, 224 such that portions of the underlying movable medium 24, 224 project beyond the overlays or such that the overlays partially translucent or transparent. In such implementations, the overlays allow a viewer to see the underlying movable medium, but add additional features or structures to the underlying real world movable medium. For example, the underlying modifiable medium may comprise the outline or profile of an object, without detail, without refined features or components, wherein the overlay adds visible details within the profile to what is seen by a viewer using optics 452.

In another implementation, controller 438 may utilize a sensed positioning and orientation of the movable medium 24, 224 as sensed by sensor 30 to control or determine the positioning of a corresponding virtual object presented on optics 452. The presented object on virtual optics 452 may be located so as to completely block out the corresponding modifiable medium on optics 452. In such an implementation, the virtual object may have a completely different shape, size or configuration than the corresponding modifiable medium within field 40. For example, the modifiable medium may comprise a square block, wherein controller 438 uses the positioning and orientation of the block to control or determine the positioning and orientation of a refined detailed virtual figurine, virtual vehicle, building or other virtual object presented on optics 452. As the viewer repositions optics 452 and/or the corresponding modifiable medium is repositioned or altered, controller 38 adjusts the positioning of the corresponding virtual object presented on optics 452 such that the virtual object presented on optics 452 continually blocks view of the more simple, but corresponding modifiable medium. In some implementations, optics 452 may be omitted.

In one implementation, virtual-reality optics 452 may comprise 3D glasses that additionally provide 3D optics such as Anaglyph 3D. Such optics 452 they provide active and passive 3D viewing that work with the modifiable field. In such an implementation, optics 452 may function as described above, but with the additional cooperation with projector 32, in the form of a 3D projector, to create a 3D enhanced image.

Controller 438 is similar to controller 30 described above except the controller 438 utilizes the three dimensional measurements from sensed field 40 by sensor 30 to automatically adjust a focus of projector 32. As indicated by broken lines and arrows in FIG. 5, sensor 30 detects the different distances, such as distances D1 and D2, from projector 32 to surfaces of the various modifiable mediums, such as modifiable medium 424, as well as modifiable medium 24 and 224. For example, the distance D1 may be different than the distance D2. Although FIG. 5 illustrates two example points with their corresponding distances D1 and D2, controller 438 may establish the focal distance of projector 32 based upon tens, hundreds or even thousands of different points or locations along the upper surfaces of modifiable mediums within sensing field 40 as sensed by sensor 30. Controller 438 utilizes such different distances to determine and set a focal distance for projector 32. For example, in one implementation, controller 438 may utilize signals from across the upper surface of medium 424 as well as the upper surface of any other modifiable mediums, such as modifiable medium 24 and 224, to determine an overall average distance from projector 32 (and/or sensor 30) to such surfaces, wherein the overall average distance is utilized to adjust the focus of projector 32 to provide an overall more clear and concise projected image upon such surfaces.

In one implementation, the adjustment of the focus is done at an initiation of system 420 prior to or at an early stage of use. In another implementation, the adjustment of the focus of projector 32 based upon sensed distances is performed automatically on a predefined periodic basis by controller 438. In yet another implementation, the adjustment of focus of projector 32 is performed in response to input through input interface 36 or another input from a user system 420. In still other implementations, the focus of projector 32 is automatically adjusted by controller 438 in response to changes in the average or other aggregate of the sensed distances exceeding a predefined threshold. In yet other implementations, the focus of projector 32 is continuously adjusted by controller 438 as mediums 24, 224 and 424 are modified.

In one implementation, controller 438 controls projector 32 so as to project the projection field 44 based upon characteristics of modifiable mediums 24, 224 and 424. In one implementation, the characteristic of the projection field change in response to changes in modifiable mediums 24, 224 and 424. In other implementations, controller 438 controls projector 32 such that the projection field 44 additionally or alternatively prompts or instructs a person in how to move or manipulate one or more of mediums 24, 224 and 424.

For example, in one implementation, system 420 may be used as part of a physical therapy system, wherein a person is prompted by the contents of projection field 44 to manually move or shift moldable me 424 and/or modifiable mediums 24, 224 in certain directions or other certain manners. Based upon this sensed movement or manipulation of mediums 24, 224 and/or 424, as prompted by projection field 44, the contents of projection field 44 may be further changed by controller 438 to reward the person or inform the person of progress, such as through a score. In such an implementation, through use of system 420, a child or adult may receive physical therapy, hand-eye coordination training, patient recovery or other physical or mental therapy.

Figure 6:
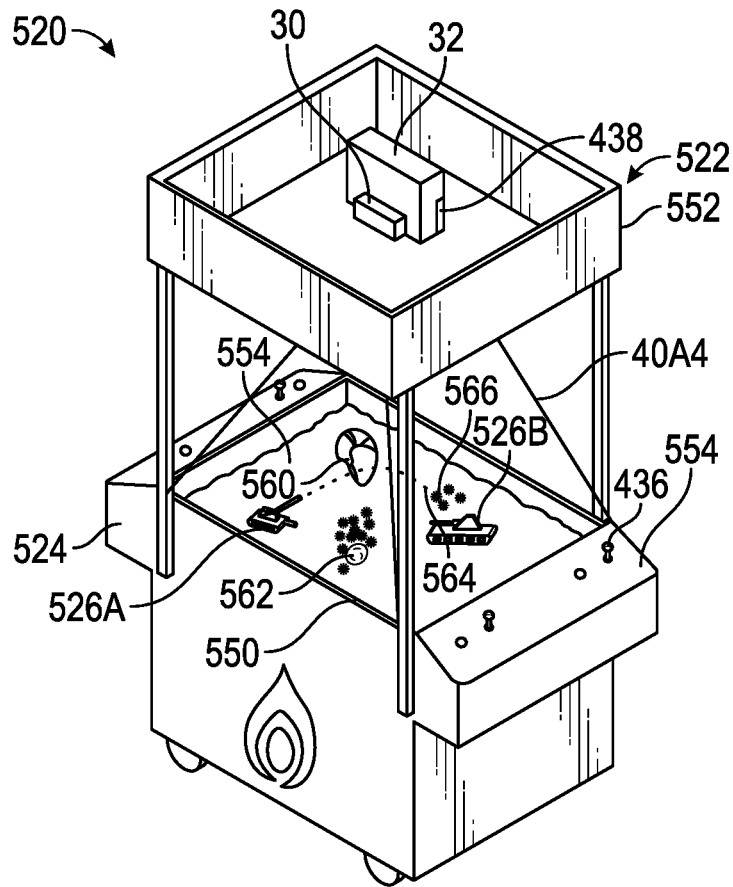
FIG. 6 is a top perspective view of another example interactive sensing and imaging system.

FIG. 6 is a more detailed schematic diagram of another example interactive imaging and sensing system 520. System 520 is illustrated as a game console or gaming kiosk. System 520 is similar to system 420. System 520 comprises housing 522, modifiable mediums in the form of moldable medium 524, modifiable object 526A and modifiable object 526B (collectively referred to as modifiable objects 526), sensor 30, projector 32, controller 438 and input interfaces 436. Housing 522 comprises bed 550, overhead support 552 and control panel 554. Bed 550 has side walls that form a basin or cavity containing moldable medium 554. In one implementation, moldable medium 554 comprises sand or other moldable particulate material. Overhead support 522 is supported above bed 550 and supports sensor 30 and projector 32.

Modifiable objects 526 comprise manually movable objects. In the example illustrated, objects 526 comprise tanks. In other implementations, the logic 526 may comprise other vehicles, may comprise locally propelled vehicles, remote-controlled vehicles, figurines or the like. Overhead support 552 is spaced from bed 550 to allow persons to reach in and manually grasp and manipulate objects 526. Overhead support 552 further allows a person to reach in and manually manipulate, mold or shape moldable medium 554. Overhead support 552 further allows a person to place new physical objects or structures on medium 554.

Control panels 554 support opposing input interfaces 436. Input interfaces 436 are similar to input interfaces 36 described above. In the example illustrated, system 520 provides four sets of input interfaces 436 facilitating four-person play. Input interfaces 436 are located outside of fields 40, 44. In the example illustrated, input interfaces 436 comprise a pushbutton and joystick. In other implementations, input interfaces 436 may have other forms of input devices. For example, input interfaces 436 may comprise a touchpad, roller ball or the like. In one implementation, control panel 554 may additionally support a display, similar to display 450 described above.

Sensor 30 and projector 32 are described above. In the example illustrated, sensor 30 and projector 32 have sensing and projecting fields 40, 44 which substantially coincide with one another and extend across the majority, if not entirety, of bed 550.

In operation, in one implementation, opponents or opposing teams are assigned a movable object, such as one team being assigned movable object 526A or the other opponent or opposing team is assigned movable object 526B. The opponents are permitted to manipulate and mold underlying physical terrain formed by moldable medium 554. At the same time, the opponents are permitted to input commands via their respective input interfaces 436.

As the opponents manipulate moldable medium 554, and/or reposition objects 526 and provide additional input through interfaces 436, controller 438 adjust the content of projection field 44 based upon the repositioning of objects 526 and the molding or manipulation of moldable medium 554. In some implementations, the player may add additional structures or objects onto or within bed 550, wherein such additional odds are sensed by sensor 30 and wherein controller 438 alters the content of projection field 44 being projected by projector 32 based upon the newly added objects or structures. In the example illustrated, projector 32 is illustrated as projecting a mountain 560 and vegetation 562 on top of the underlying moldable medium 554. In circumstances where either opponents changes the shape of moldable region 554, controller 438 may sense changes and cause projector 32 to change what is projected to change the characteristics of what is being projected onto moldable medium 554. In the example illustrated, user input through input interfaces for 436 may constitute a fire command. In response to such input, controller 438 may direct projector 32 to project a trajectory of an artillery shell 564 and a subsequent explosion 566.

Figure 7:
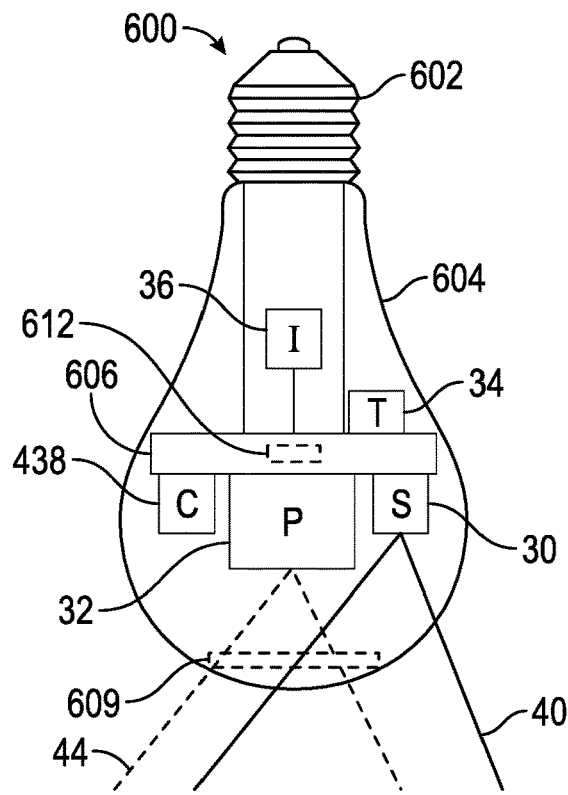
FIG. 7 is a side view schematically illustrating another example interactive sensing and imaging device.

FIG. 7 is a schematic diagram of an example interactive imaging and sensing device 600. Device 600 may use as part of and in the above described systems 20, 220, 420, 520 and other system described hereafter. Device 600 configured as a lightbulb, utilizing power provided through a typical light ball socket. As a result, device 600 may be easily added to existing arrangements by simply being screwed into an existing overhead, downwardly facing light socket. Device 600 comprises base 602, housing 604, platform 606, sensor 30, projector 32, transceiver 34, input interface 36 and controller 438.

Base 602 comprises a structure configured to couple housing 604 to a light socket. For purposes of this disclosure, the phrase "configured to" denotes an actual state of configuration that fundamentally ties the stated function/use to the physical characteristics of the feature proceeding the phrase "configured to". Base 602 may be a standard size lamp base, such as an Edison screw (ES) threaded base, a bayonet base, a bi-post base, a bi-pin base, a GU24 type base, or other type of lamp base designed to mate with a corresponding light socket. Base 602 may be secured to housing 604 with, for example, an adhesive, by mechanical crimping to housing 604. Base 602 may include suitable electrically conductive structures such that electric current may be transferred to devices electrically coupled to base 602 when housing 604 is coupled to a light socket. For example, base 602 may be a standard ES base having a conductive threaded portion that is connected to neutral conductor in a light socket and an isolated contact on the bottom tip of base 602 that is connected to a hot conductor in the light socket.

Housing 604 extends from base 602 and encloses the remaining components of device 600. Housing 604 may be in substantially the shape of a light bulb. The term "light bulb" as used herein includes light sources of the type typically used in light fixtures such as motion sensing security light fixtures, including, for example, incandescent, gas discharge (e.g., a compact fluorescent lamp (CFL)), arc, LED, laser diode, and other types of bulbs, lamps and globes of any standard shape or size. For example, the housing may be substantially shaped like a standard 120 V or 230 V incandescent general service or high wattage general service light bulb (e.g., general (A), mushroom, elliptical (E), sign (S), tubular (T), pear shaped (PS)), a decorative style bulb (e.g., candle (B), twisted candle, bent-tip candle (CA & BA), flame (F), globe (G), lantern chimney (H), fancy round (P)), a reflective type bulb (e.g., standard reflector (R), elliptical reflector (ER), flood types (FL), spot types (SP), parabolic aluminized reflector (PAR), multifaceted reflector (MR)), etc. The term "substantially shaped" as used herein refers to housings having the overall outermost shape, profile, or form factor of a light bulb, but allowing for minor deviations and/or alterations. Such deviations and/or alterations may include, for example, protrusions, recesses, or surface textures to accommodate, for example, access panels, device installation and removal, switches or other control devices mounted internally or externally, lenses, sound ports, and/or other devices, as well as minor non-functional style deviations. For example, housing 604 may be substantially shaped like a helical CFL by substantially retaining the outermost dimensions of the CFL (e.g., a volume substantially defined by rotating the CFL 360 degrees about an axis passing longitudinally through the base and helical tube structure) without necessarily retaining the exact shape of the helical lamp structure.

Housing 604 may be formed from any suitable material depending on the particular application, such as, for example, such as metal, plastic, ceramics, glass, fiberglass, plexiglass, or compounds and synthetics based thereon. Housing 604 may be transparent, translucent, or a combination thereof. Housing 604 may be formed and shaped in any suitable manner. For example, adjustment member 604 may be molded, cast, extruded and machined, etc. Housing 604 may be substantially hollow, substantially solid with compartments or other structures formed therein, filled with appropriate sealing materials, etc.

As shown by broken lines, in one implementation, housing 604 comprises an additional lens 609 facilitate the projection field 44 being projected by projector 32 as described above. In some implementations, lens 609 may be formed as part of the exterior curved surface of housing 604. In other implementations, lens 609 may be omitted.

Platform 606 comprises a structure that supports sensor 30, projector 32, transceiver 34 and controller 438. In one implementation, platform 60652 by which such components are elected to one another. In one implementation, platform 606 comprises an integrated circuit board having electronic componentry and circuit traces.

Sensor 30, projector 32 and controller 438 are each described above. Transceiver 34 comprises a device to facilitate wireless communication with an external or remote network. For example, in one implementation, transceiver 34 facilitates near-field communication using Bluetooth, RF signals or the like. In one implementation, transceiver 34 facilitates communication with a portable electronic device in a wireless fashion, either directly or through a network router. In one implementation, transceiver 34 facilitates communication with a portable electronic device such as a personal data assistant, a flash memory player, a smart phone, a laptop computer, notebook computer, or other manually curable portable electronic device. Transceiver 34 facilitates control of device 600 via a touch screen or other control inputs of the portable electronic device. In some implementations, device 600 may omit controller 438, wherein controller 438 is remotely located and communicates with sensor 30 and projector 32 using transceiver 34.

In one implementation, the imaging operation or functionality of projector 32 may be selectively turned off, wherein projector 32 emits a uniform blanket of light, such as white light or a colored light which is dispersed by lens 609 such that device 600 serves or operates as a lightbulb or lamp, simply providing homogenous light or homogenous, unimaged illumination. In another implementation, as shown by broken lines, system 600 may additionally comprise one or more light emitting elements 612, such as one or more light emitting diodes, supported by platform 606 or other structures within housing 604. Light emitting element 612 may comprise light emitter elements similar to those found in light-emitting diode (LED) light bulbs, wherein the light provided by light emitting element 612 allows system 600 to serve as a lightbulb, providing homogenous substantially uniform illumination. In one implementation, device 600 is actuatable between different modes comprising a first mode in which projector 32 provides light in the form of images as described above and a second mode in which projector 32 is inoperable, but wherein light emitting element 612 is actuatable between and on and off state, wherein device 600 serves as a lamp or lightbulb providing a blanket of homogenous light when light emitting element 612 is in the on state. In one implementation, light emitting element 612 may be selectively controllable by controller 438 to provide dimmable homogenous or uniform light.

Input interface 36 is described above. In the example illustrated, input interface 36 comprises a button formed on the exterior of housing 34 and in connection with controller 438. Input interface 36 may facilitate the input of settings to controller 438. In one implementation, projector 32 may operate in a normal light emitting mode wherein projector 30 to simply project light as in a standard lightbulb or may operate in the projecting and sensing mode, described above. In one implementation, input interface 36 allows a user to toggle device 600 between the two different modes of operation.

Figure 8:
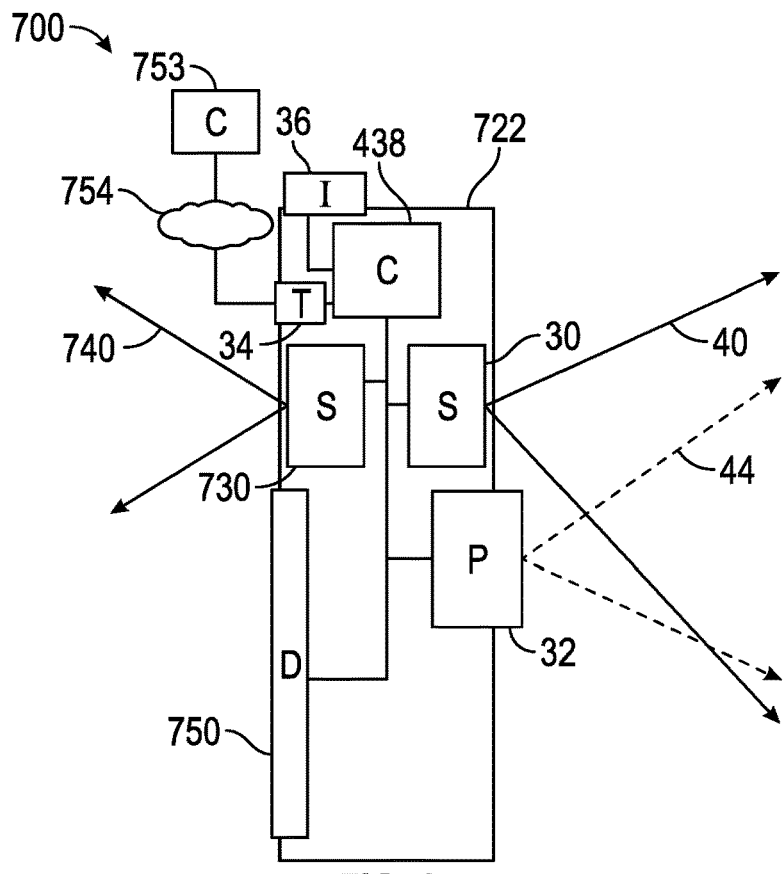
FIG. 8 is a side view schematically illustrating another example interactive sensing and imaging device.

FIG. 8 schematically illustrates interactive imaging and sensing device 700 and example of a device that be used as part of system 20, 220 or 420 described above. Device 700 comprises a portable electronic device, a device that is sized and has a weight so as to be manually carried. In one implementation, device 700 is similar in size to that of a tablet computer, smart phone, personal data assistant or the like. Device 700 comprises housing 722, sensor 30, projector 32, transceiver 34, input interface 36, controller 438, sensor 730, and display 750.

Housing 722 comprises the outer shell about the remaining components of device 700. Housing 722 supports circuit boards and electronics for each of the electronic components of device 700. Sensor 30, projector 32, transceiver 34, input interface 36 and controller 438 are each described above.

Sensors 738 is substantially similar to sensor 30 except that while sensor 30 faces in a forward direction, the same direction at which projector 32 faces, sensor 730 faces in a rearward direction. As shown by FIG. 8, while sensor 30 senses three dimensional measurements and a sensor field 40 and while projector 32 projects the projection field 44, both in a first direction away from a front of device 300, sensor 730 senses three-dimensional measurements in a second sensing field 740 which faces in a direction substantially opposite to the direction of sensing field 40. Sensor 730 allows sensing of the person, object or the environment behind device 700.

In operation, controller 438 adjusts or control the content of projection field 44 additionally based upon input from sensor 730. In one implementation, controller 438 may direct projector 32 to project an image of the person holding device 700, as part of projection field 44. In another implementation, controller 438 may control movement, orientation or other characteristic of a projected object or structure in projection field 44 based upon hand gestures, facial gestures or other object manipulations within the sensing field 740 of sensors 730. Although sensor 730 is depicted as facing in a direction directly opposite that of sensor 30, in other implementations, sensor 730 may alternatively face in other directions distinct from that of sensor 30. For example, sensor 730 may alternatively face in a direction up or down, angled 90° from the direction of sensor 30.

Display 750 comprises a display screen supported by housing 722. In one implementation, display 750 operates similar to display 450 described above. In one implementation, display 750 may alternatively display what is being seen by sensors 730. In some implementations, display 750 may be omitted.

As further shown by FIG. 8, in some implementations, transceiver 34 may be in communication with a remote controller 753 through a network 754. And 53 may carry out the functions described above with respect to controller 438. In some implementations, some of the computational processes carried out by controller 438 may be shared or allocated to controller 753, reducing the computing demands for controller 438 in the portable device 700. In yet other implementations, controller 438 may access a database associated with controller 753 to obtain additional data, wherein controller 43 additionally controls the content of projection field 44 based upon the additional data retrieved across network 754.

In one implementation, device 700 may be in communication with yet an additional similarly configured device 700 at a different location, providing communication between two remote devices 700 gaming or other purposes. For example, in one implementation, controller 438 may control projector 32 and/or display some 50 to provide an image that is based upon data from the sensing field 40 of the remote device 700.

Figure 9A:
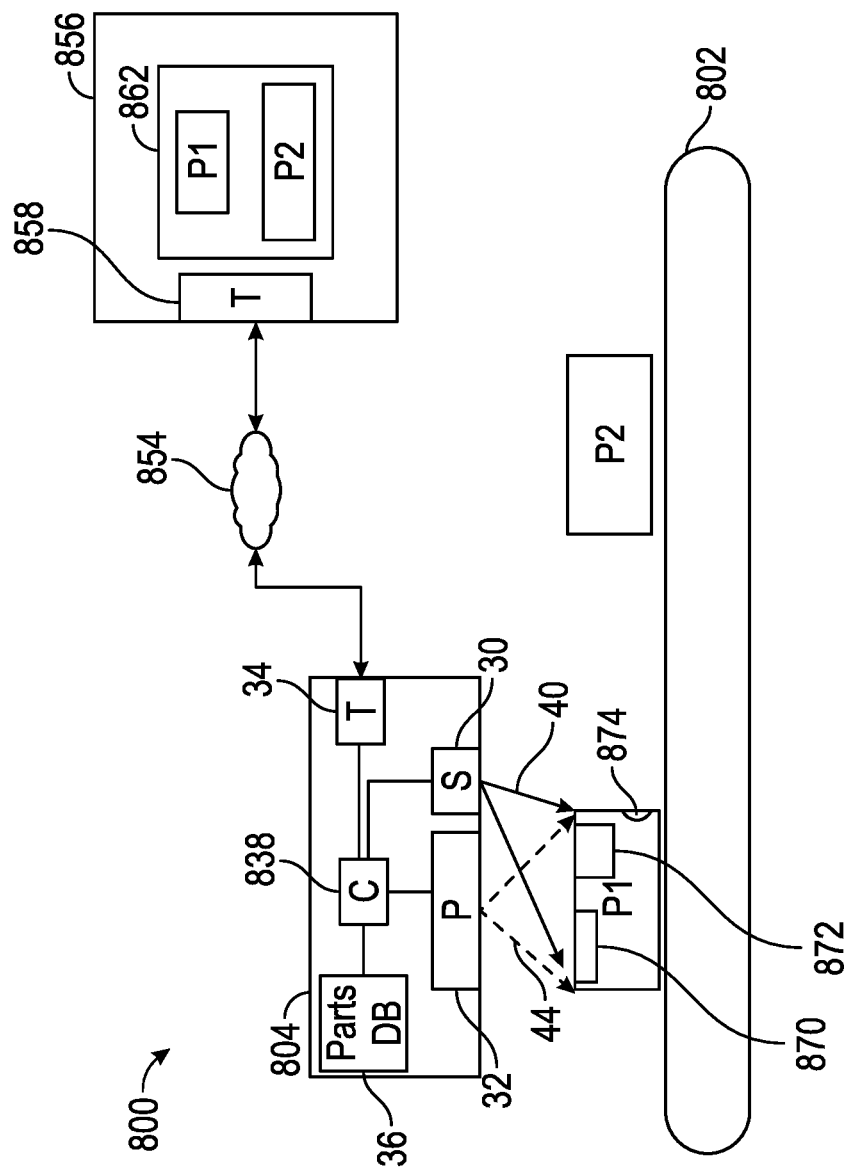
FIG. 9A is a side view schematically illustrating an example quality control system.

FIG. 9A schematically illustrates an example quality control system 800. System 800 comprises part transport 802 and interactive sensing and projection device 804. Part transport 802 positions parts, such as parts P1 and P2, with respect to device 804. In the example illustrated, part transferred 802 comprises a conveyor belt sequentially positions parts within the projection and sensing fields of device 804. In other implementations, part transferred 802 may comprise other devices to position parts within the projection in sensing field of vice 804. For example, in one implementation, transport 802 may comprise a manufacturing robot. In yet other implementations, transport 802 may be omitted, wherein parts are manually placed in and removed from the projection and sensing fields of device 804.

Device 804 is positioned opposite to transport 802. Device 804 senses parts as they are being positioned by transport 802 and projects images onto are about such parts based upon sensed characteristics of the parts. Device 804 comprises sensor 30, projector 32, transceiver 34, parts database 36 and controller 838. Sensor 30 and projector 32 are described above. Sensor 30 senses three-dimensional measurements or takes three-dimensional measurements from within a three dimensional sensing field 40. Projector 32 projects an image or projection across the projection field 44. Fields 40 and 44 extends so as to encompass individual parts as they are being positioned by transport 802.

Transceiver 34 is described above. Transceiver 34 communicates via a network 854 to a remote database 856. Remote database 856 comprises a transceiver 858 facilitating communication across network 854. Remote database 856 further comprising a computer server which accesses a non-transitory memory serving as a database 862 containing or storing target three-dimensional measurements and associated tolerances for different parts, such as parts P1 and P2, that may be positioned by transport 802 and for which quality control is to be exercised. In other implementations, such target three-dimensional measurements and associated tolerances may be stored as part of parts database 36 at device 804.

Controller 838 is similar to controller 438 described above. Controller 838 carries out quality-control based upon signals from sensor 30 and provides output using projector 32. In operation, as a part is positioned within sensing field 40 of sensor 30, controller 838 determines the identity of the part within sensing field 40. In some implementations, this step may be omitted if transport 802 consistently positions the same type for inspection by device 804. Controller 838 then obtains the target three-dimensional measurements for the identified part. In one limitation, controller 838 accesses the remote database 856 using transceiver 34. In another implementation, controller 838 accesses the target matches and tolerances contained in parts non-transitory computer-readable medium or memory serving as database 36. Controller 838 obtains three-dimensional measurements of multiple different surfaces of the part. Controller 838 then compares the sensed and received three-dimensional measurements to the corresponding obtained target three dimensional measurements.

As schematically shown by FIG. 9A, based upon the comparison of the sensed and received three-dimensional measurements to the corresponding obtained target three dimensional measurements, controller 838 outputs control signals to adjust the content of projection field 44. In one implementation, controller 838 causes a projector 32 to project images or projections 870, 872 onto a surface of the part. Such images or projections may indicate a degree or extent to which the sensed three-dimensional dimensions or measurements of the part correspond to the target three-dimensional measurements for the part. For example, images 870, 872 may comprise textual messages indicating the degree of conformance or quality. In other implementations, images 870, 872 may have different colors, wherein the different colors correspond to different degrees or levels of the determined conformance with the target dimensions.

In still other implementations, controller 838 may control projector 32 so as to project a target edge 874 for the part or object onto the part or object. In such a manner, the operator may visibly see the difference between the actual edge and the target edge for the particular type of part. In yet other implementations, controller 838 may control projector 32 so as to project and overlay of the entire same part having target dimensions onto the actual part being inspected such that the operator or inspector may visibly see all of the differences between the target part and the actual part being inspected. In one implementation, the result of the comparison may additionally be stored in a non-transitory memory, such as parts database 36 or may be transmitted to a remote storage, such as remote database 856.

Figure 9B:
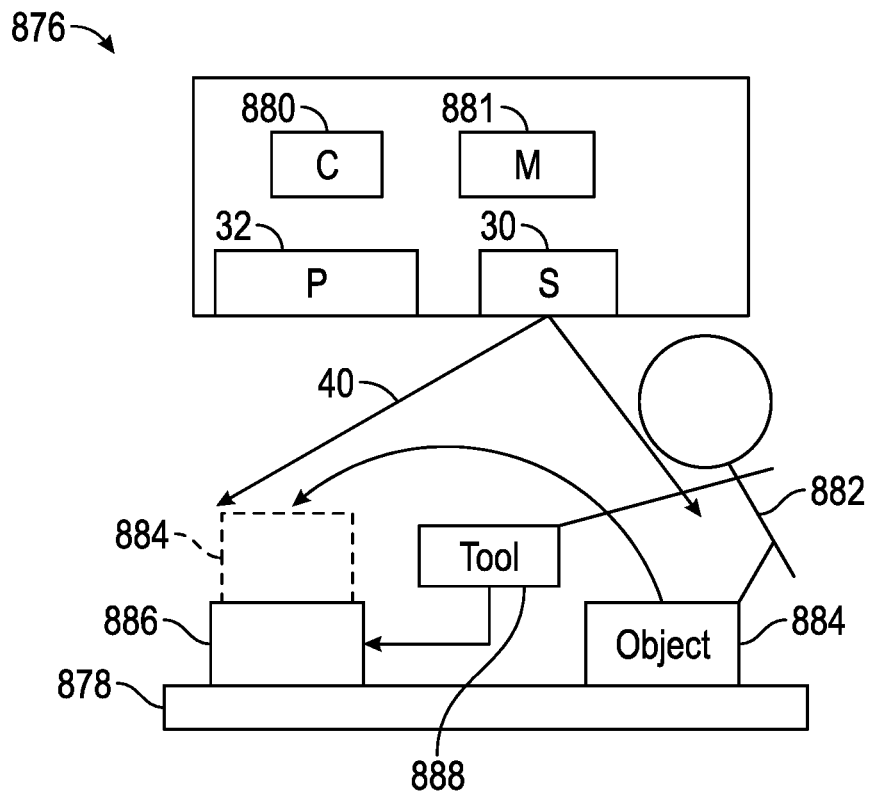
FIG. 9B is a side view schematically illustrating an example robotic instruction generation system.

FIG. 9B schematically illustrates robotic instruction generation system 876. System 876 facilitates the automatic or semi-automatic generation of code or instructions for directing at least one robot to carry out a pre-described process. Such a process may involve the assembly of multiple distinct objects in the manufacturing environment, may involve the assembly of multiple objects in a food preparation environment or the performance of work on an object, such as welding, fasting, fusing, cutting, ablating and the like.

System 876 is positioned opposite to work surface 878. System 876 senses interactions between and with various objects in the three-dimensional space adjacent to work surface 878. Based upon such sensed interactions in the sensed positional coordinates of such sensed interactions, system 876 automatically or semi automatically generates instructions for subsequently maneuvering or manipulating portions of a robotic system to carry out the same interactions with corresponding objects. System 876 comprises sensor 880, projector 32 and controller 838. Sensor 30 and projector 32 are described above. Sensor 30 senses three-dimensional measurements or takes three-dimensional measurements from within a three dimensional sensing field 40. Sensor 30 senses the precise three-dimensional coordinates or locations of surfaces or structures associated with the object or parts being manipulated or worked upon as well as precise three-dimensional coordinates or locations of various points of any tools being utilized.

In the example illustrated, projector 32 projects an image or projection across the projection field. The fields of sensor 30 and projector 32 encompass individual parts or objects as they are being positioned or manually manipulated. In one implementation, projector 32 projects instructions to direct a person 882 in the manipulation of the objects or tools within field 40 of the sensor 30. In other implementations, projector 32 may be omitted.

Controller 880 comprise a processing unit that utilizes the sensed three-dimensional orders or positions of the various objects/parts and tools being manipulated and utilized in the process as well as the relative timing, such as the timing at which a tool may be actuated, to automatically or semi automatically generate instructions or code for subsequent control over robots a robotic mechanism to carry out the same process. For example, in one implementation, an operator 882 may carry out a process involving the manipulation of or positioning of an object 884 with respect to another object or part 886. The operator 882 may further manipulate or control a tool 888 with respect to part 884 or part 886. Examples of the tool may be a fastener, a welder, a saw, a laser or the like. During such manipulation, sensor 30 senses three-dimensional positions of various surfaces of the objects in the tool as they are being manipulated over time. Controller 880 utilize the sensed data values to output code or instructions.

In one implementation, controller 880 identifies each unit of movement within field 40 and identifies and selects stored predefined modules of code or instructions, stored in a memory 881 of code modules for robotic mechanisms, corresponding to the sensed units of motion. For example, controller 80, using spatial vision recognition, may identify an upward motion of an article, part or tool. Controller 880 may then retrieve a predefined or pre-established module of code, a code building block, that is to direct a particular robotic mechanism to also carry grip the part/tool at the same locations in carry out the same upward motion.

The three-dimensional coordinates sensed and recorded over time as the object/parts and tools are manipulated as well of the sensed relative velocities, acceleration's and timing at which the various positions or coordinates are attained are automatically inserted by controller 80 into the retrieved modules of code or instructions for the robotic mechanisms. For example, with respect to the example above, the magnitude of the upward movement, it's acceleration and timing may be added to the retrieved module of code by controller 880 based upon the corresponding sensed values from sensor 30. Controller 880 may carry out such a process with each discernible portion or subset of the overall manipulation of the object/part or tool based upon the signals from sensor 30. The various retrieved modules and the inserted magnitude and timing values collectively form a set of instructions for the robotic mechanism so as to carry out the manual process that was captured by sensors 30. The resulting instructions or code may be utilized by the robotic mechanisms or controllers for the robotic mechanisms to precisely emulate the manual process sensed by sensor 30.

Figure 9C:
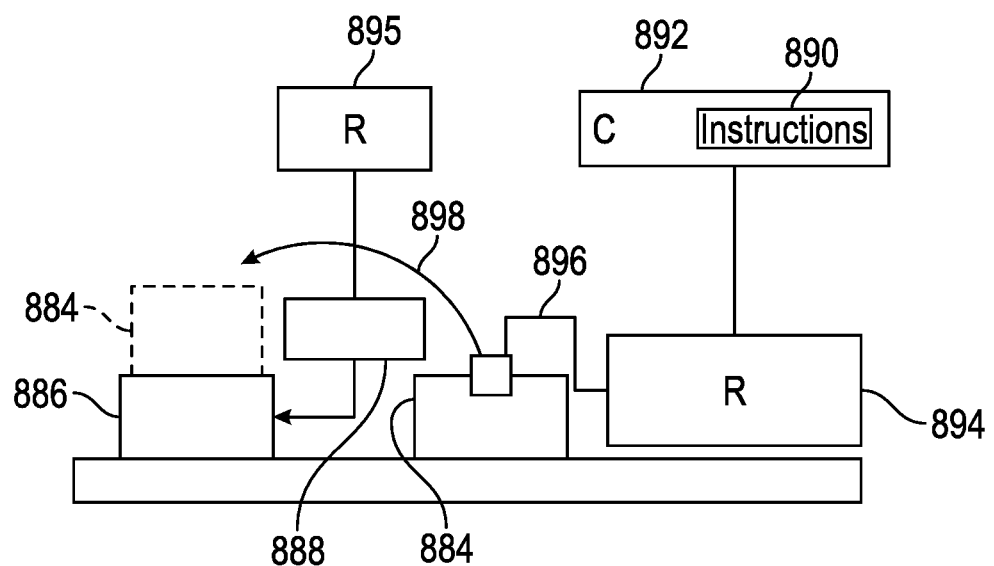
FIG. 9C is a side view schematically illustrating robotic mechanisms carrying out the robotic instructions generated with the system of FIG. 9B.

As shown by FIG. 9C, the generated code or instructions 890 are utilized by the same controller or a different controller 892 to output control signals controlling the operation of robotic mechanisms 894, 895 so as to carry out the same process that was previously manually carried out in FIG. 9B. For example, such instructions 890 may direct controller 892 to output control signals directing robotic mechanism 894 to actuate the articulated arm 896 to grasp and reposition object 884 as indicated by arrow 898, matching the previous manually performed positioning. Likewise, such instructions 890 may direct controller 892 to output control signals directing robotic mechanism 8942 position and manipulate tool 888 with respect to parts 884 and 886 in a similar fashion as was previously carried out in FIG. 9B.

Figure 10:
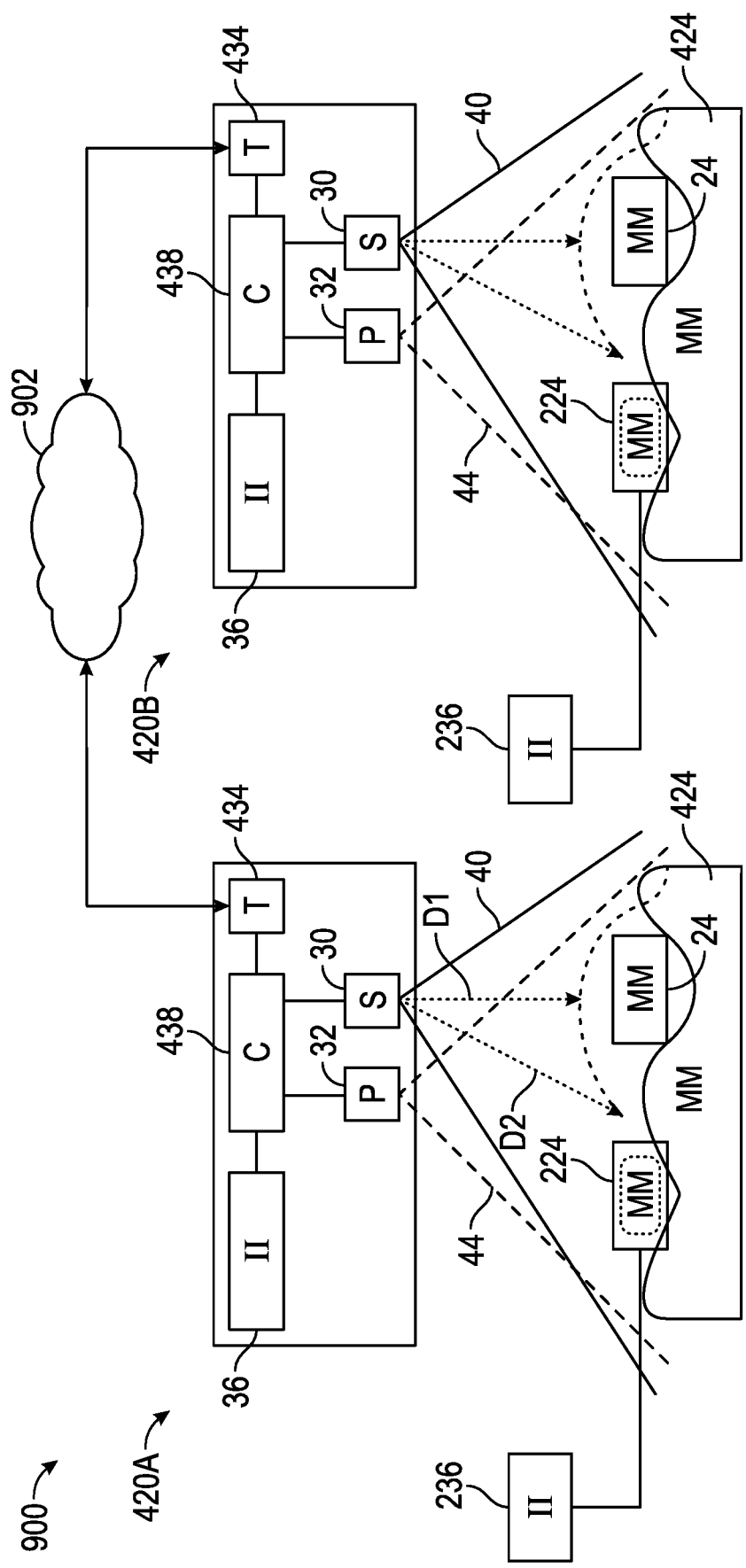
FIG. 10 is a side view schematically illustrating another example interactive sensing and imaging system.

FIG. 10 schematically illustrates interactive imaging and sensing system 900 facilitates interaction between two remote participants or users. System 900 comprises individual interactive imaging and sensing systems 420A and 420B (collectively referred to as systems 420). Systems 420A and 420B are each similar to system 420 described above. Each of systems 420 comprises a transceiver 434 to facilitate communication with each other across network 902.

In one interactive mode of operation, controller 438 of system 420A controls projector 32 of system 420A based upon signals from sensor 30 of system 420B. As a result, the player at system 420A can see the manipulations of the modifiable member by the player at system 420B through the projected field 44 of projector 32 at system 420A. At the same time, controller 438 of system 420B controls projector 32 of system 420B based upon signals from sensor 30 of system 420A. As a result, the player at system 420B can see the manipulations of the modifiable member by the player at system 420A through the projected field 44 of projector 32 at system 420B. In other implementations, each of systems 420 may omit one or more of modifiable members 24, 224 and 424. In such implementations, input interfaces 36 and/or 236 may additionally be omitted. In some implementations, each of systems 420 may additionally comprise display 450 and/or optics 452 as described above with respect to system 420 in FIG. 5.

Figure 11:
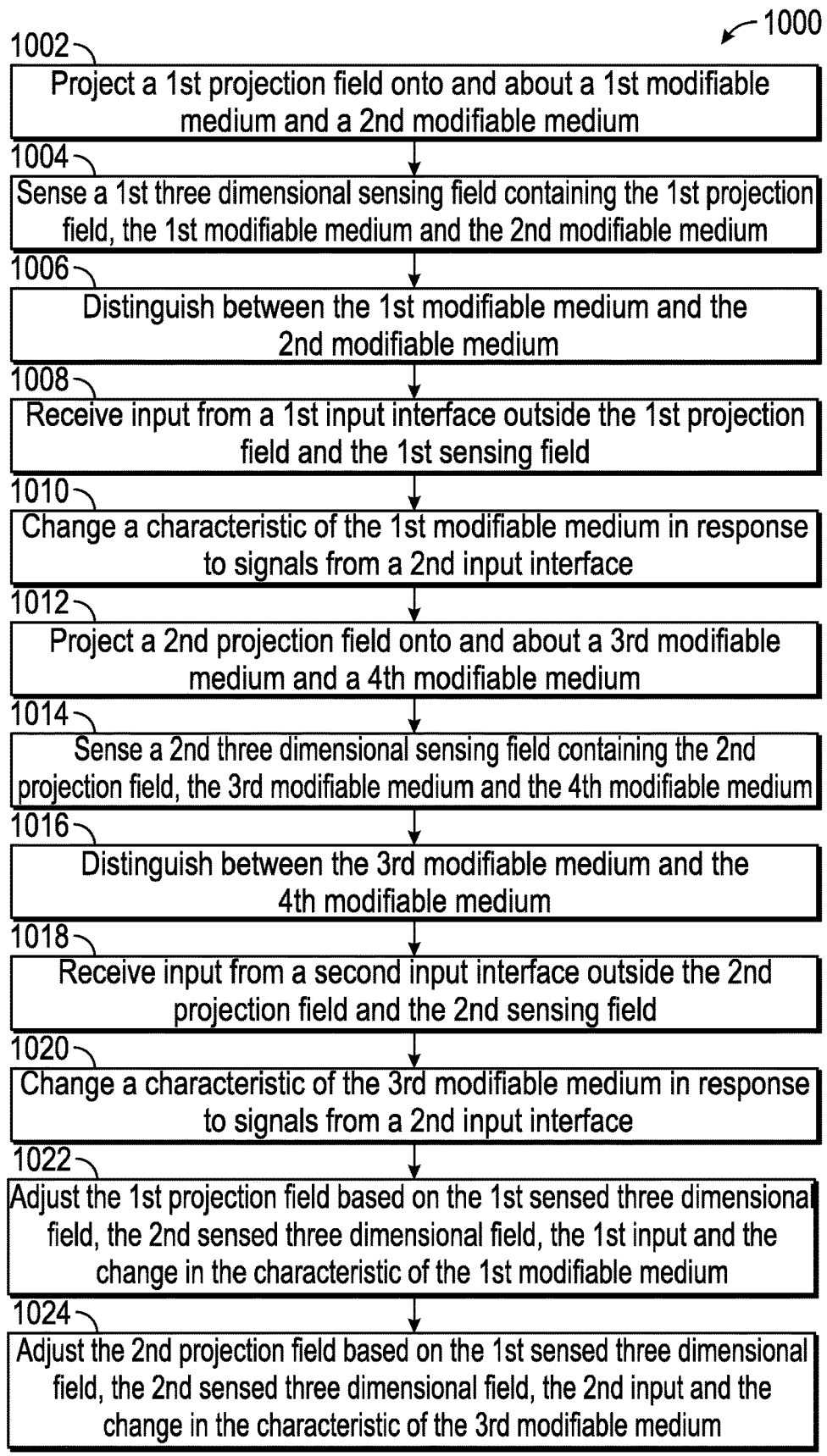
FIG. 11 is a flow diagram of another example interactive sensing and imaging method.

FIG. 11 is a flow diagram of an example method 1000 that may be carried out by system 900. As indicated by block 1002, controller 438 of system 420A directs projector 32 of system 420A to present a projection field 44 about modifiable mediums 24 and 424. As indicated by block 1004, controller 438 of system 420A outputs control signals directing sensor 30 of system 420A to sense a three-dimensional sensing field 40 which contains projection field 44, modifiable medium 24 and modifiable medium 224. As indicated by block 1006, controller 438 utilizes the signals received from sensor 30 of system 420A to distinguish between modifiable medium 24 and modifiable medium 224 of system 420A. As indicated by block 1008, controller 438 further receives input from input interface 36. As indicated by block 1010, a characteristic of modifiable medium 224 is further change in response to signals from input interface 236. The changed characteristic may be size, shape or positioning of modifiable medium 224.

As indicated by block 1012, controller 438 of system 420B directs projector 32 of system 420B to present a projection field 44 about modifiable mediums 24 and 424 in system 420B. As indicated by block 1014, controller 438 of system 420B outputs control signals directing sensor 30 of system 420B to sense a three-dimensional sensing field 40 which contains projection field 44, modifiable medium 24 and modifiable medium 224. As indicated by block 1016, controller 438 utilizes the signals received from sensor 30 of system 420B to distinguish between modifiable medium 24 and modifiable medium 224 of system 420B. As indicated by block 1018, controller 438 further receives input from input interface 36. As indicated by block 1020, a characteristic of modifiable medium 224 of system 420B is further changed in response to signals from input interface 236 of system 420B. The changed characteristic may be size, shape or positioning of modifiable medium 224 of system 4206.

As indicated by block 1022, controller 438 of system 420A adjusts content of projection field 44 based upon the three-dimensional dimensions in the three-dimensional field 40 of system 420A, the three-dimensional measurements in the three-dimensional field 40 of system 420B, the input provided by input interface 36 of system 420A and the changes in the characteristics of modifiable member 224 resulting from signals from input interface 236 of system 420A. As indicated by block 1024, controller 438 of system 420B adjusts content of projection field 44 based upon the three-dimensional dimensions in the three-dimensional field 40 of system 420B, the three-dimensional mentions in the three-dimensional field 40 of system 420A, the input provided by input interface 36 of system 420B and the changes in the characteristics of modifiable member 224 resulting from signals from input interface 236 of system 4206.

Figure 12:
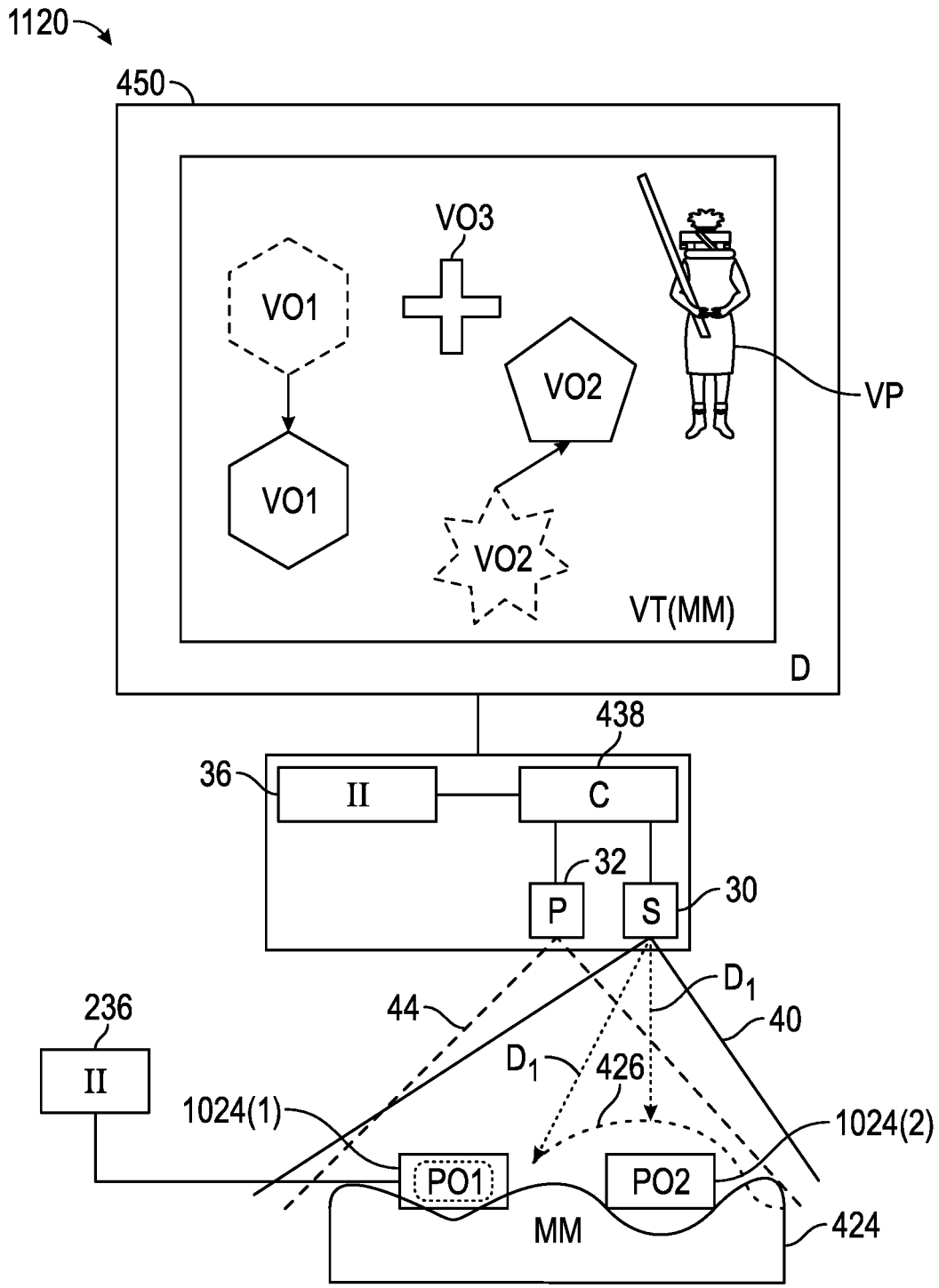
FIG. 12 is a schematic diagram of another example interactive sensing and imaging system.

FIG. 12 schematically illustrates an example interactive imaging and sensing system 1120. System 1120 is similar to system 420 described above. In the example illustrated, controller 438 generates and presents virtual objects VO1, VO2 on display 450 which correspond to positionable objects 1024(1) and 1024(2) (collectively referred to as objects 1024). Such virtual objects may be identical to the actual configuration of the positionable objects 1024(1) and 1024(2) or may be based upon, but not identically correspond to the positionable objects 1024(1) and 1024(2). For example, positionable object 1024(1) may comprise a first object having a first level of detail, wherein controller 38 generates and presents a virtual object VO1 on display 450, wherein the virtual object VO1 corresponds to the real world physical object in location and orientation, but wherein the virtual object VO1 has a different color or combination of colors, a second much greater level of detail or additional features. In such an implementation, movement of positionable object 1024(1) and/or positionable object 1024(2) results in results in a corresponding movement of the corresponding virtual object VO1 and/or virtual object VO2, respectively, (as indicated by broken lines in FIG. 12).

In such an implementation, controller 38 may also generate and present a virtual terrain VT(MM), underlying the virtual objects VO1 and VO2 on display 450, wherein the virtual terrain corresponds to the configuration of modifiable medium 424. For example, a person may manually shift the sand or other moldable medium of modifiable medium 424 which results in the virtual terrain presented on display 450 also correspondingly changing.

As further illustrated by FIG. 12, in some implementations, pursuant to a software program, contained in a non-transitory computer readable medium, controller 43 may additionally add virtual objects, such as virtual object VO3 which you not correspond to any actual real world physical objects. The movement, size, shape and positioning or configuration of virtual object VO3 may be varied in response to input received from input interface 36 or automatically in response to changes in other positionable objects 1024. In some implementations, sensor 30 (or another sensor) may be utilized to capture an image of the person utilizing system 1120, wherein controller 438 generates a virtual person based upon the captured image of the person utilizing system 1120. In one implementation, the virtual person may identically match the captured image of the person. In yet another implementation, as illustrated by virtual person VP in FIG. 12, the virtual person VP may be based upon the captured image of the person utilizing system 1120, but may be additionally altered and/or supplemented by controller 438. For example, controller 43 may modify shape, size or configuration of the captured image or may add additional features, clothing, accessories or the like to generate VP. Movement, positioning or actions of the virtual person VP may occur in response to input received through input interface 36 and/or the sensing of modifiable mediums 424 and positionable objects 1024.

Although FIG. 12 illustrates the use of both modifiable medium 424 and positionable objects 1024, it should be appreciated that system 1120 may be utilized with modifiable medium 424 alone. As noted above, such modifiable medium 424 may comprise building blocks, such as LEGO™ building blocks or any other physical articles such as pillows, cans or the like. In some implementations, the display 450 of system 1120 may additionally include or be based upon a modifiable medium 424 of a different player at a different remote location. For example, multiple remote players may each assemble their respective modifiable mediums which are used to form the terrain VT(MM) presented on the display 450 which is concurrently presented to and shared by both of the remote players. Each of such players may further manipulate their respective positionable objects 1024 (when provided) as well as any respective virtual objects VO2/VO3. In such a fashion, system 1120 may be part of a multi-player gaming environment wherein each of the players, using his or her own modifiable mediums 424, may build or construct the overall larger virtual terrain VT(MM) in which both players play and participate.

Figure 13:
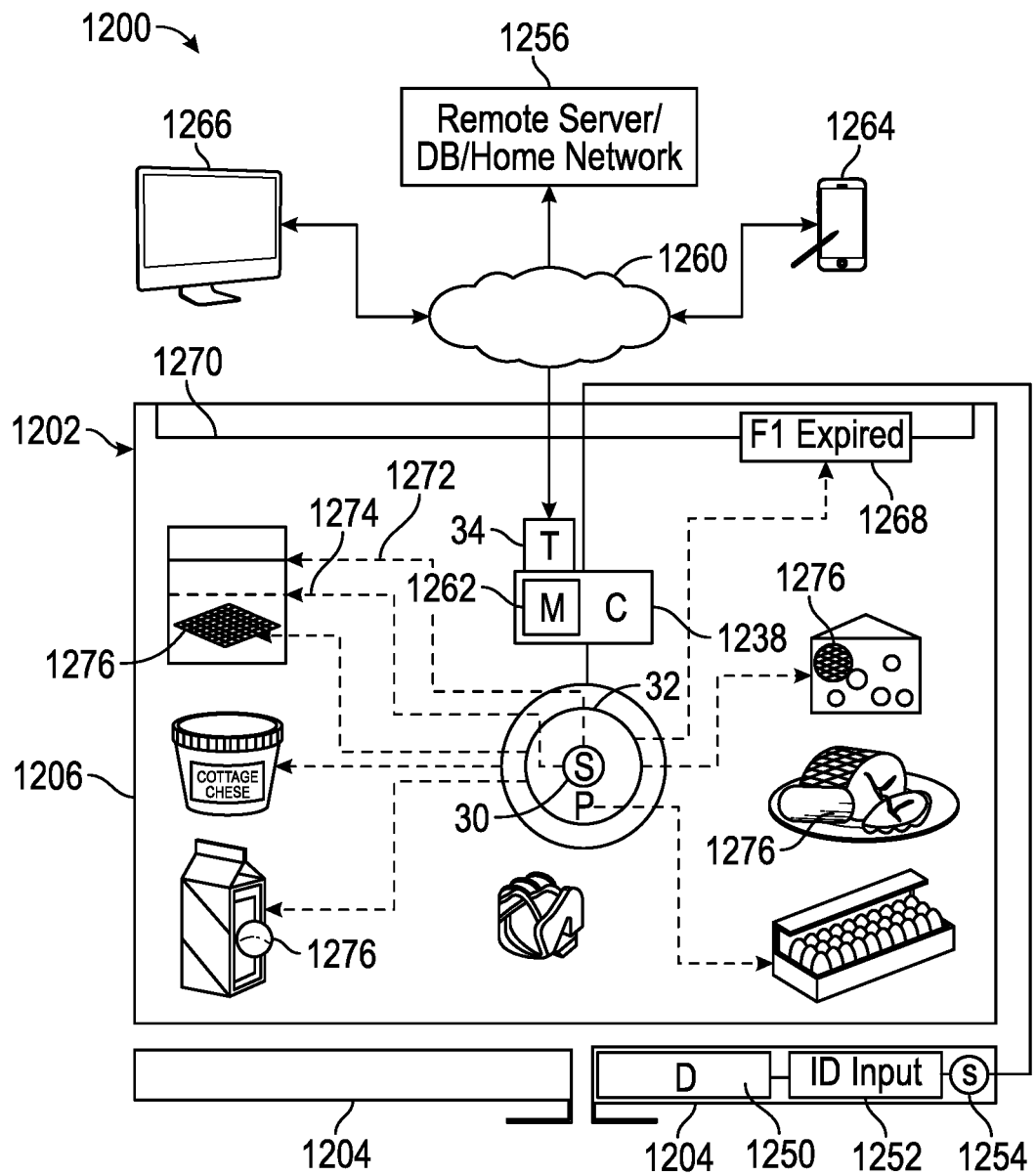
FIG. 13 is a schematic diagram of an example food monitoring system.

FIG. 13 schematically illustrates an example food monitoring system 1200. System 1200 comprises food storage region 1202, three-dimensional sensor 30, projector 32, transceiver 34, controller 1238, display 1250, ID input 1252, sensor 1254 and remote server/database/home network 1256. Food storage region 1202 comprises a region to contain food items, whether the food items be unpackaged or packaged (in a container). In one implementation, food storage region 1202 may store such food in unrefrigerated state. In another implementation, food storage region 1202 may comprise a refrigeration volume, wherein the food is kept cold, but above freezing. In another implementation, food storage region 1202 may comprise a freezer compartment or compartments, wherein the food is kept in a frozen state. In yet other implementations, food storage region 1202 may comprise a pantry, shelf or other unrefrigerated region. In the example illustrated, food storage region 1202 comprises a refrigerator having a pair of split doors 1204 for accessing the interior compartment or chamber 1206 of the refrigerator.

Three-dimensional sensor 30 and projector 32 are similar to the above described sensors 30 and projectors 32. In the example illustrated, sensor 30 and projector 32 are provided as part of a dome-like unit mounted above the volume of food storage region 1202, above food articles or objects resting upon the shelf or floor of the compartment 1206 and are more likely to be in line of sight for each of the food items in compartment 1206. In other implementations, sensor 30 and projector 32 may be provided at other locations within compartment 1206.

Transceiver 34 is described above. Transceiver 34 facilitates communication between controller 1238 and other remotely located devices or systems via network 1260. For example, transceiver 34 may facilitate communication with remote server/database/home network 1256.

Server/database/home network 1256 may serve as an external or remote source for updated information regarding modified or new food items or products such as modified or new food item or product configurations (to facilitate identification of the new food item or products) or such as new nutritional information regarding existing, modified or new food items or products. In one implementation, server/database/home network 1256 may serve as an automatic source for updated information for system 1200. In some implementations, controller 12 38, rather than being provided as part of food storage region 1202, such as a refrigeration unit, may alternatively be remotely provided at a remote server/database/home network 1256, wherein food storage region 1202 comprises less or even minimal computing power and processing functions.

Controller 1238 is similar to controller 438 described above except the controller 1238 follows instructions contained within a non-transitory memory 1262 to carry out various food monitoring functions. In one implementation, controller 1238 comprises a processing unit that, following instructions contained in memory 1262, identifies at least some of food items within food storage region 1202 based upon signals from three-dimensional sensor 30. In one implementation, controller 1238 utilizes signals from sensor 30 to identify each and every food article or item or object within storage region 1202. In yet other implementations, controller 1238 utilizes signals from sensor 30 to identify selected food articles or items, those items which may be more likely to expire or become less edible due to age. Such identification may be based upon the shape, color or texture of a food item. In one implementation, controller 1238 receives three-dimensional measurements and color values from sensor 30 compares those against a predefined database of corresponding three-dimensional measurements and color values to identify a food item. Such identification enables identification of each food item within storage region 1202 despite the fact that such food items may be repeatedly relocated and repositioned within storage region 1202.

In one implementation, controller 1238 further determines a characteristic of each of the identified objects. The characteristic may comprise the age of the item, a nutritional value of the item, a remaining amount of the food item or the like. The age of an item may be determined by tracking a time when the food item $1^{st}$ appeared or is registered by controller 1238 and the current date or time. The nutritional value of the item may be read directly from a side of the packaging or may be retrieved from a local or remote database based upon the identification of the food item. The remaining amount of the food item or the like may be determined by signals indicating three-dimensional measurements of the food item. For example, the level of juice or milk in a container may be determined by controller 1238 from signals from projector 32 which may vary along the length, width or height of the packaging or container, the signals being the result of varying colors or contrasts in color along the outside of the container. The level of a liquid within a container may be indicated by a line discernible through the semi translucent wall of the container. Based upon the determined characteristic or multiple characteristics of the identified object, controller 1238 outputs a notification.

In one implementation, the notification may be based upon a residence time of the object or food item within compartment 1206. In one implementation, the notification may indicate the residence time of the particular food item or object. In one implementation, the characteristic of the identified food object may comprise an expiration date of the food item or object. For example, expiration date may be read on the container or packaging of the food item. In such an implementation, controller 1238 output a notification based upon the determined expiration date and the current date. For example, the notification may indicate that the expiration date is approaching. In another implementation or mode, the notification may alternatively or additionally indicate when the expiration date has past such that the food item or object should not be consumed.

In yet another implementation, the characteristic of the food item or object may comprise the amount or volume of the food object or item remaining. For example, as indicated by arrows 1272 and 1274, sensor 32 may detect the level or amount of the food item within the container or packaging. Based upon the remaining amount left as indicated by the signals from sensor 30, controller 1238A present a notification indicating that the current level of food item or that the food item will shortly need to be replenished. In some implementations, controller 1238 may identify the absence of a particular food item or object, wherein the notification indicates that the food item needs to be replenished or may be replenish displayed. In one implementation, the notification may be in the form of a grocery list that generated and is presented on display 1204 or is transmitted to portable electronic device 1264 or monitor 1266 via network 1260. In yet another implementation, the notification may automatically transmitted across never 1260, using transceiver 34, to a store or other food supplier for addition to a list of food items are objects to be delivered either immediately or periodically.

In one implementation, controller 1238 outputs the notification which is presented on display 1250 on door 1204. In yet another implementation, controller 1238 outputs the notification to a portable electronic device 1264 (such as a personal data assistant, tablet computer, notebook computer, smart phone or the like) using transceiver 34 and network 1260 and/or to eight smart television, computer monitor or other display 1266 connected to transceiver 34 by a wide area network (the Internet) or by a local area network (a home network).

In yet another implementation, the notification may additionally or alternatively be presented using projector 32. In one implementation, controller 1238 may direct projector 32 to project a textual message or textual notification, such as notification 1268. The textual notification may be projected onto a rear display or projection panel 1270 adjacent to food storage region 1202. In one implementation, the textual notification may project onto a rear panel or surface within the interior of the apartment 1206.

In one mode of operation, the notification may further be projected directly onto the food item or object of interest. For example, FIG. 12 illustrates various illuminations 1276, whether such illuminations being the form of white spots of light or whether such illuminations being the form of projected colors of light or more complex images or texts of light. For example, controller 1238 may output control signals directing projector 32 to project an individual projection having a selected color, shape, shade or text providing the notification. The shape, color, shade or text may vary from one food item to another depending upon the urgency or nature of the notification.

For example, in instances where a food item is approaching its expiration date, controller 1238 may direct processor 32 to project a yellow projection, such as a yellow spot on to the food item. In instances where a food item has passes expiration date, but is within a week or other reasonable extension beyond the expiration date, projector 32 may be directed to project a red marker or other spot on the food item. In instances where the food item is beyond the expiration date and beyond the grace period, controller 1238 may direct projector 32 to project a black spot are marker onto the food item indicated that should not be consumed.

In other instances, controller 1238 may direct projector 32 to project spots, markers or other projections onto individual food items based upon the amount remaining of the food item. For example, a first colored spot or other marker may be projected by projector 32 onto an individual food item when the food item is half full. A second color spotter other marker, different than the first color spotter marker, the objective of projector 32 onto the individual food item when the food item is one quarter full. Additional colors or other shaped markers may be projected onto food items to indicate other levels or remaining amounts of food.

In one implementation, controller 1238 may periodically determine the remaining amount of a food item contained in a food container package and track the rate at which the fluid item is being consumed. Based upon the determined rate at which the food item is being consumed, controller 1238 may determine what color or shape or text of a notification should be directly projected onto the food item of interest. For example, in one implementation, controller 1238 may determine an estimated time at which the fluid item will be completely consumed. Based upon this estimated time of exhaustion, controller 1238 may project different notifications, such a different colored markers are different shaped markers are different text at different times preceding the estimated time or date of exhaustion. As a result, even though two different food items may be at the same level with regard to the amount remaining, the food item that is being slowly consumed may receive a different projected mark or notification as compared to the projected mark or notification on the food item that is being more rapidly consumed. The mark or notification projected on the second food item that is more rapidly being consumed may indicate a more urgent need to plan for the replenishment of the second food item.

In some implementations, the projected mark or spot serving as a notification may indicate the residence time of the fluid item in storage region 1202, wherein prolonged resonance types may suggest that the food item should no longer be consumed or may additionally or alternatively indicate that planning should be made for replenishment or replacement of a particular food item. Such illuminations 1276 provide a person who simply opens the doors 1204 with an immediate visible indication of the status of many, if not all, of the food items within storage region 1202. The person may quickly discern, from the illuminations on the individual food items, which food items are running low and/or which food items should be consumed or discarded.

In some implementations, controller 1238, utilizing the determined nutritional characteristics of a particular food item, may direct projector 32 to project an illumination, such as a spot of white light or a projected image, such as a graphic or text, directly on the food item based upon the nutritional characteristics of the particular food item. For example, more healthy food items may receive different illuminations as compared to less healthy food items. In one implementation, projector 32 may visibly highlight those food items which are more nutritious or healthy, providing a persuasive reminder regarding the personal value of some food items and dissuading consumption of other food items. For example, a particular healthy food item may be placed in the "spotlight".

In one implementation, controller 1238 may provide such notifications in a customized fashion based upon the particular individual who is currently accessing the food contained within storage region 1202. In such an implementation, controller 1238 determines an identification of the person accessing storage region 1202 using one or both of ID input 1252 and sensor 1254. ID input 1252 comprises a device by which a person may enter his or her identification. In one implementation, ID input 1252 may comprise a touch screen or touchpad. In one implementation, ID input 1252 may comprise a card reader or other similar token receiver. In some implementations, ID input 1252 may be incorporated into display 1204 as part of a touchscreen, wherein a person may enter his or her ID. In some implementations, sensor 1254 a capture an image of the person accessing storage region 1202 or may detect the fingerprint or other biometric information of the person as the person grasps the handle of either of doors 1204 or as a person places his or her finger or other anatomy against the fingerprint reader or other biometric reader.

Using the determined identification of the person currently accessing food storage region 1202, controller 1238 accesses the database, stored in memory 1262 or stored in a remote memory or database 1256 to retrieve information regarding the identified person. Such information may include nutritional, health or weight goals or objectives of the person, health records or history of the person, food consumption history of the person and the like. Based upon such information, controller 1238 may provide notifications on display 1204, a portable electronic device 1264 or on monitor 1266. In some implementations, controller 1238 may provide notifications using projector 32. Such modifications may indicate or suggest what food items should be consumed at a particular time or what food items should be avoided. For example, if the health records of the person indicate that the person is allergic to certain food items, projector 32 may be directed to project an illumination 1276 having a color, shape or text that warns against consumption of the food item. Likewise, if the person has diabetes, projector 32 may be directed to project an illumination 1276 that varies based upon the sugar content of a food item. In one implementation, the insulin level of the person maybe sensed and provided to controller 1238, wherein controller 1238 cause a projector 32 to illuminate or highlight those food items based upon the current insulin level of the person accessing food storage region 1202.

Based upon the retrieved nutritional, health or weight goals of the person currently accessing storage unit 1202, projector 32 may project different illuminations 1276 onto different food items. For example, controller 1238 may project the first illumination on those fruit or low-fat food items and may project a second different illumination on fatty or less healthy food items. Based upon the food consumption history of the person accessing food storage region 1202, controller 1238 may cause projector 32 to differently illuminate different food items. For example, if the history indicates that the person has previously consumed an inordinate amount of proteins or meat, controller 1238 may cause projector 32 to differently illuminate high-protein food items as compared to other food items that may be currently lacking in the person's daily or weekly diet, such as fruits and vegetables or dairy. If the person's daily diet is currently lacking fruits and vegetables or dairy, such fruits and vegetables or dairy may be illuminated with a green colored illumination whereas other food items already abundantly consumed in the person's daily diet may receive a red or black illumination, suggesting consumption of the fruits and vegetables or dairy as compared to consumption of more protein. In one implementation, using signals from sensor 30, controller 1238 not only determines the consumption of a particular food item, but the amount of the particular food item that was consumed. In such an implementation, controller 1238 serves as a health nutritionist, utilizing projector 32 and its illuminations on different food items to suggest to the person currently accessing food storage region 1202 those food items that should be consumed for more healthy result.

In one implementation, food monitoring system 1200 may additionally or alternatively serve as a reservation system. For example, where quantities of particular food item may be low, a parent may provide input to controller 1238, through a keyboard, touchscreen on display 1250 or other input device, reserving use of the particular food item by a particular individual. If a different person axis food storage region 1202 who is not authorized to use a particular food item, controller 1238 may cause projector 32 to illuminate the reserved food item with a notification (spot of white light, colored light, graphic or text) indicating to the current person accessing storage region 1202 that they are not to consume the particular illuminated food item. In one implementation, the authorized use or consumption of a food item may not necessarily be based upon the ID of the person, but may be based upon and entered time of day or time of week. For example, if the level of milk is running low and milk as needed subsequently for the next morning's breakfast, adverse may enter the reservation with a reservation ending time following the next morning's breakfast. In such an implementation, up until the expiration time of the reservation, controller 1238 may cause projector 32 to project a notification onto the reserved food item. After expiration time of the reservation, the projection may be terminated or the illumination may have different characteristics.

Figure 14:
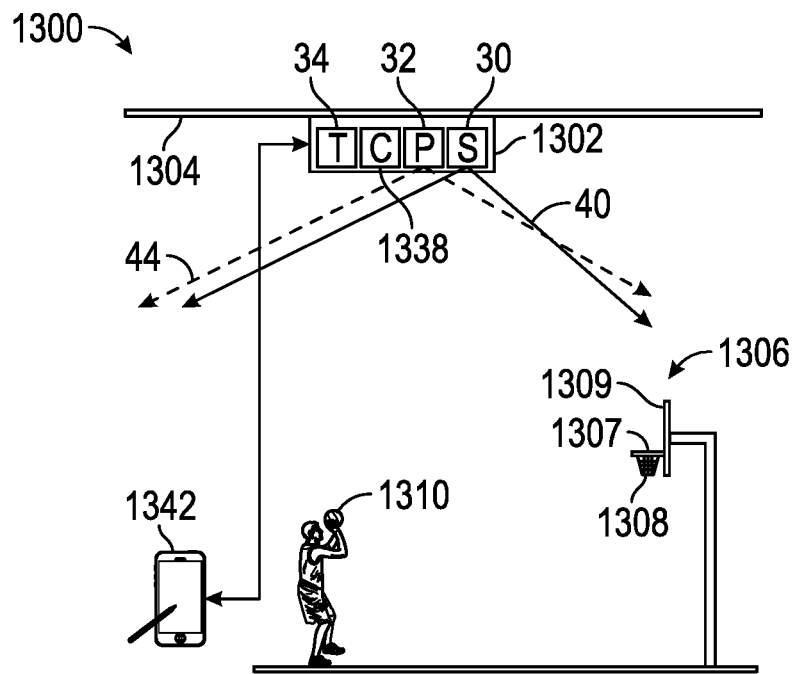
FIG. 14 is a side view schematically illustrating an example sport training system.
Figure 15:
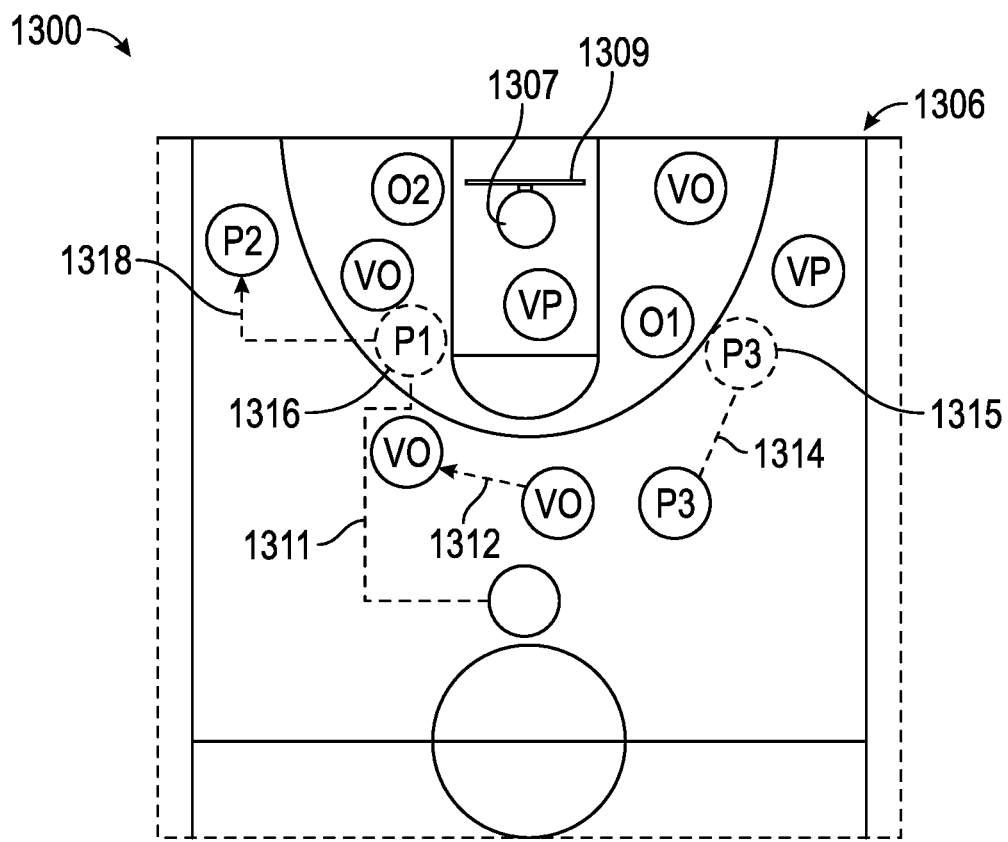
FIG. 15 is a top view schematically illustrating the example sport training system of FIG. 14.

FIGS. 14 and 15 schematically illustrate an example sport training system 1300. Sport training system 1300 facilitates the training of individuals in a sport. Although system 1300 is illustrated in conjunction with team basketball, in other implementations, system 1300 may be employed in other sports involving movement of players such as football, hockey, soccer, lacrosse, baseball, softball or other sports. As shown by FIG. 14, system 1300 comprises interactive imaging and sensing device 1302. Device 1302 is configured to be mounted to an overhead surface or support such as a ceiling 1304. In other implementations, device 1302 may be supported generally above a sport playing region by a poll or other structure. In the example illustrated, sport playing region 1306 comprises a basketball half court having a basketball rim 1307, basketball net 1308 in a basketball backboard 1309 for use with a projectile, a basketball 1310. In other implementations, the sport region 1306 may comprise a full basketball court or two may comprise other configurations depending upon the sport being analyzed or for which training is being provided.

Device 1302 comprises sensor 30, projector 32, transceiver 34, controller 1338 and control/input device 1342. Sensor 30, projector 32 and transceiver 34 are described above. Sensor 30 senses three dimensional measurements across and within a three-dimensional sensing field 40. Projector 32 projects a three-dimensional projection or image across the projection field 44. Fields 40 and 44 extend across and encompass sport playing region 1306, including the half basketball court and any persons or players on the basketball court. Transceiver 34 facilitates communication between controller 1338 and control/input device 1342.

Control input device 1342 comprises a device, such as a portable electronic device, that facilitates the transmission of commands, selections, data and other information to controller 1338 in a wired or wireless fashion. In one implementation, device 1342 communicates in a wireless fashion and comprises a portable electronic device such as a smart phone, tablet computer, personal data assistant, notebook computer or the like.

Controller 1338 interactively and in a closed loop fashion directs sensor 32 to sense three dimensional measurements across and within sensing field 40, wherein controller 1330 utilizes the sensed information to control the content of projection field 44 being projected by projector 32 onto and about the sport playing region 1306. FIG. 15 illustrates example content of projection field 44 projected by projector 32, wherein the content is changed based upon signals from sensor 30. In the example shown in FIG. 15, sensor 30 senses the positioning of different real players, P1, P2, P3, who are designated to be on the same team as well as real opponent players O1, O2 or designated to be on an opponent team. Based upon the sensed real world players, controller 1338 may cause projector 32 to project other virtual players are opposing players to complete the two teams. In the example illustrated, projector 32 projects markers, such as circles, onto the court floor, the circles and textual labels indicating or identifying the player opponent and associated team. For example, virtual players were on the same team as players P1-P3 are labeled as "VP" (virtual player) whereas virtual opponent players on the opponent team are labeled as "VO" (virtual opponent). In operation, as the positioning of players P1-P3 or opponent players 01-02 changes, as sensed by sensor 30, controller 1338 correspondingly cause projector 32 to change the content of projection field 44 such that the position of virtual players VP and virtual opponent players VO also change based upon the new positioning of players P1-P3 or opponent players 01-02. In the example illustrated, as player P1 moves to the left (as indicated by broken lines), the projection of virtual opponent VO also moves to the left as indicated by arrow 1312.

In one implementation, controller 1338 may cause projector 1338 to project a particular arrangement of virtual players and opponent players onto the floor of sport playing region 1306, the arrangement being based upon a predefined expected defense or positioning of players. In such an implementation, controller 1338 may cause projector 32 to project recommended positioning/movement/action real world players P1-P3 and 01-02. For example, controller 1338 may cause projector 32 to project Path 1314 and the new suggested positioning 1315 of player P3 onto the floor of region 1306. Projector 32 may likewise be directed to project path 1311 and the recommended new position 1316 for player P1 onto the floor of playing region 1306. In some implementations, controller 1338 may additionally cause projector 32 to project the recommended movement 1318 of a sport projectile, in this case, the basketball 1310, on the floor of sport region 1306. The content, such as the projected positions of the virtual players and virtual opponents as well as the recommended path for the real players and the recommended path for the sport projectile may be changed in near real time in response to signals from sensor 30. As a result, row or players may be "walked through" different plays, wherein the person may visibly see, on the floor of sport playing region 1306, the position of opponents as well as their movement or responses to the movement of the real world players. System 1300 allows players to dynamically practice plays or player movements, wherein the players may see the expected positioning of opponents and the expected movement of opponents as virtually represented by the images being projected onto the floor or court of playing region 1306. The players may also be presented with dynamic visible projected content providing recommended paths and recommended ball passes at different points in time during a play. Such projects are dynamic in that they constantly change in response to changes in the sense positioning of the players and the ball.

Figure 16:
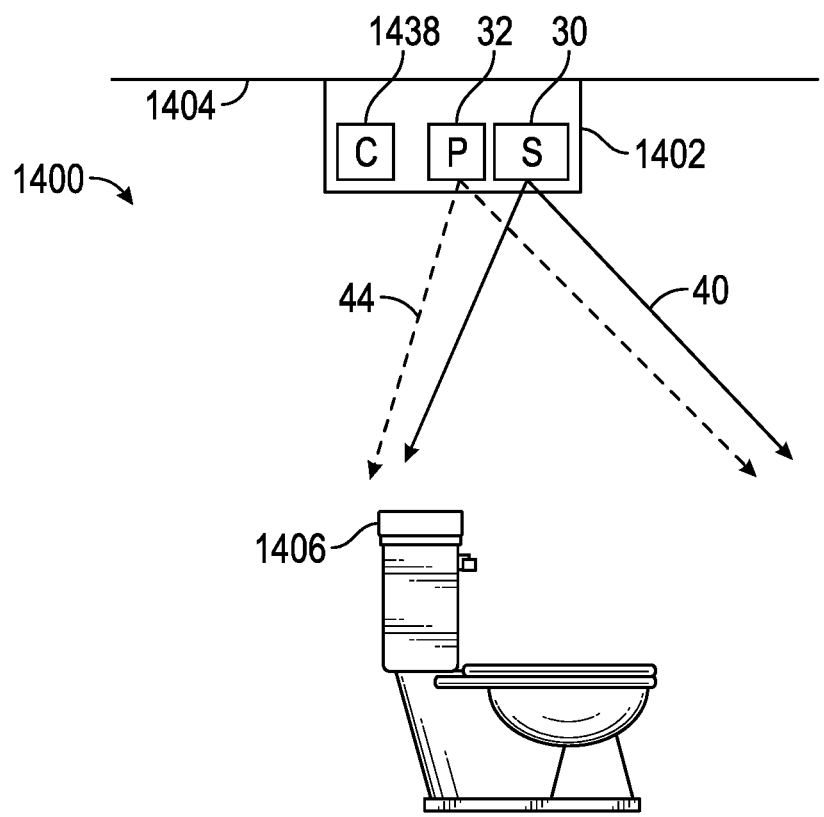
FIG. 16 is a side view schematically illustrating an example potty training system.

FIGS. 16-19 schematically illustrate an example potty training system 1400. As shown by FIG. 16, potty training system comprises interactive imaging and sensing device 1402. Device 1402 is configured to be mounted to a ceiling 1404 above a toilet 1406 such that fields 40 and 44 encompass toilet 1406 and regions in front of toilet 1406. Device 1402 comprises sensor 30, projector 32 and controller 1438. In some implementations, device 1402 may additionally comprise a transceiver 34 (shown and described above) to facilitate communication with a remote device, such as device 1342 to facilitate input of controls, selections or commands to device 1402 or to facilitate the transmission of movies or other entertainment to device 1402 for subsequent projection.

Controller 1438 is similar to controller 438 described above. As will be described hereafter, device 1402 senses three dimensional measurements in sensing field 40, wherein controller 1438 alters the content of the projection field 44 by projector 32 based upon the sensed movement of objects or structures, modifiable mediums, contained within sensing field 40. The content of projection field 44 is altered to walk a toddler step-by-step through a potty training regimen.

Figure 19:
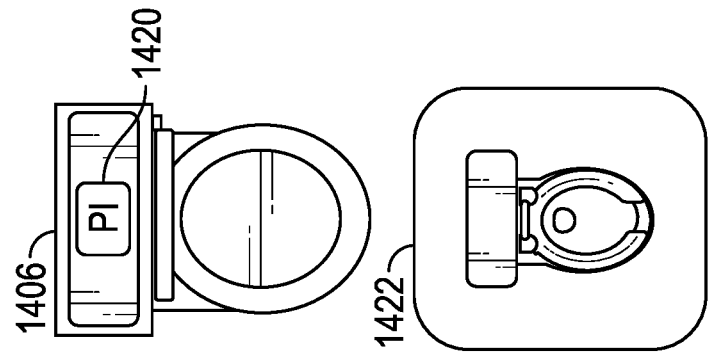
FIGS. 17, 18 and 19 are top views of the example potty training system of FIG. 16.
Figure 18:
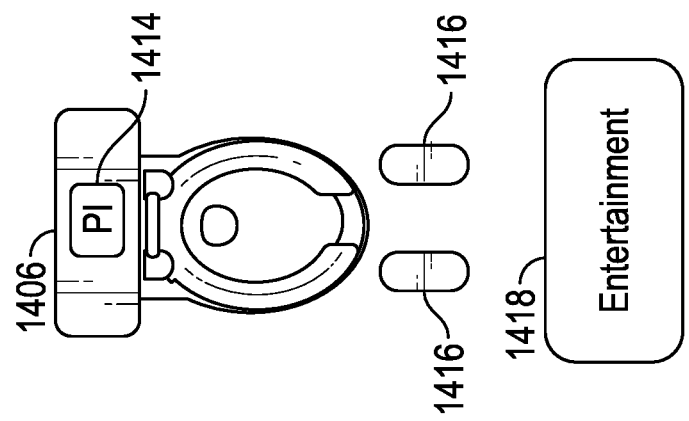
Figure 17:
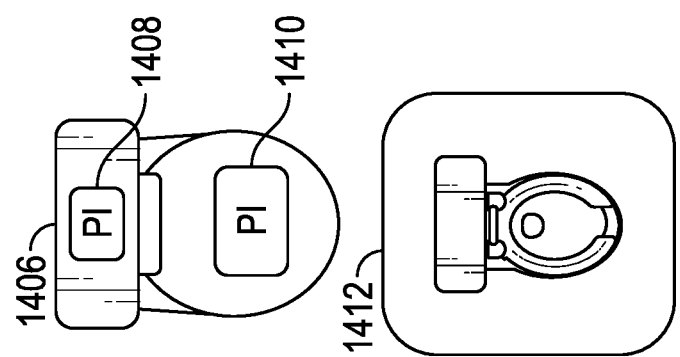

FIGS. 17-19 are top views illustrating toilet 1406 and different example projections made by projector 32 in response to sensed positions of toilet 1406 and the toddler within sensing field 40. FIG. 17 illustrates toilet 1406, upon which projected instructions 1408 and 1410 are projected by projector 32. Such instructions may be taxed or maybe pictures are graphics. Graphics or pictures facilitate instruction for a toddler who may not be able to read. The content of projection field 44 may additionally comprise a projected graphical depiction 1412 of toilet 1406 illustrating the next step or positioning of toilet 1406. In the example illustrated, projected graphical depiction 1412 depicts the toilet seat cover being lifted.

In response to sensor 30 sensing the lifting of the toilet seat cover, controller 1438 controls projector 32 to alter the content of projection field 44 two project secondary different project instructions 1414, and projected foot locations 1416 which are projected onto the floor in front of toilet 1406. Such projections suggest to toddler or child the next steps. After signals from sensor 30 indicate that the toddler is properly positioned upon toilet 1406, controller 14 308 projects entertainment 1418 (schematically illustrated) onto the floor in front of toilet 1406. Such toilet may be a video, cartoon or other information further instructing the toddler in the potty training regimen or simply entertaining the toddler while he or she waits to complete the ball movement.

In response to signals from sensor 30 indicating completion of the potty action by the toddler, controller 1438 directs projector 32 to project further projected instructions 1420 as well as graphical depiction 1422. In one implementation, graphical depiction 1422 illustrates the lowering of the toilet seat for the proper positioning of the toilet seat. In other implementations, graphical depiction 1422 may provide a cartoon or video presenting information regarding proper use of toilet paper. In some implementations, controller 1438 may cause projector 32 to project a congratulatory projection or "good job" notification for the toddler to encourage further training or use of toilet 1406.

In some implementations, in response to signals from sensor 30 indicating completion of the action by the toddler, controller 1438 may output signals transmitted via transceiver 34 across the network to a portable electronic device, smart phone or other electronic notification recipient of an adult or parent, wherein the signals notify the parent or adult that the toddler or child may need further assistance completing the potty training practice, such as assistance with toilet paper. In some implementations, controller 1438 initiates the potty training regimen and the projected images based upon a sensed identification of the person approaching toilet 1406 based upon signals received from sensor 30. For example, controller 1438 may not initiate the potty training regimen when adults or older age children approach toilet 1406.

Figure 20:
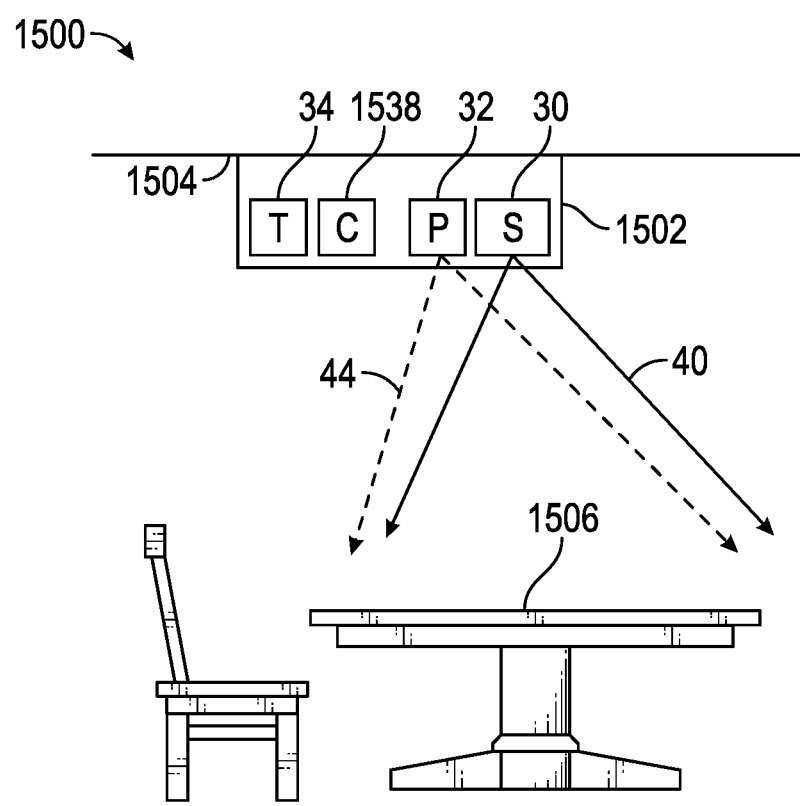
FIG. 20 is a side view schematically illustrating food ordering and entertainment system.
Figure 21:
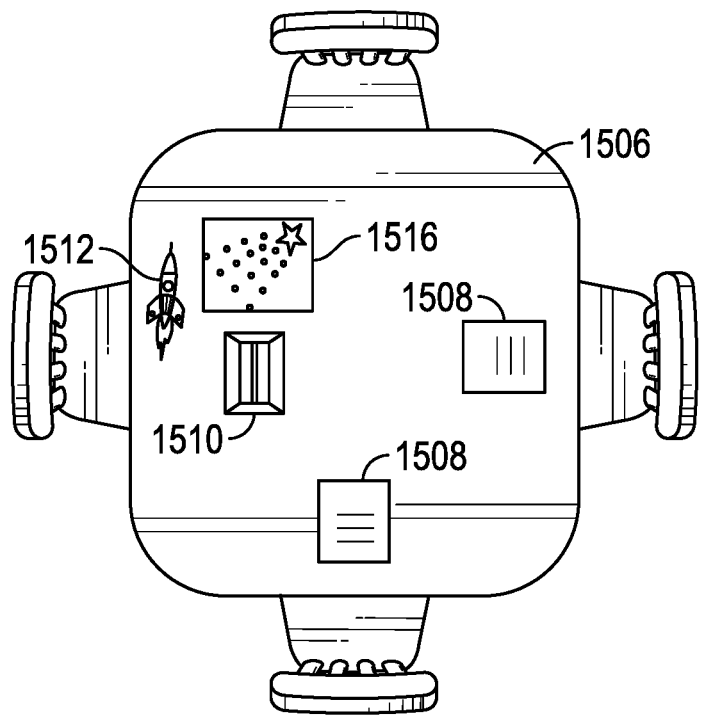
FIGS. 21 and 22 are top view schematically illustrating portions of the example food ordering and entertainment system of FIG. 20.
Figure 22:
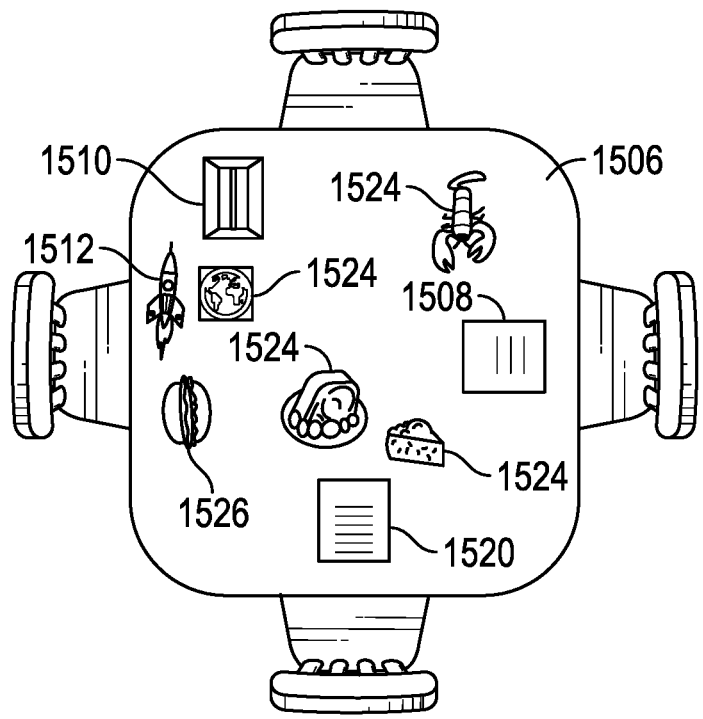

FIGS. 20-22 illustrate an example food ordering and entertainment system 1500. System 1500 comprises interactive imaging and sensing device 1502. Device 1502 is configured to be mounted to a ceiling 1504 above a dining area or surface, such as above a table 1506 such that fields 40 and 44 encompass the upper surface of table 1506. Device 1502 comprises sensor 30, projector 32, transceiver 34 and controller 1538. Transceiver 34 facilitates communication with a remote device, such as device 1342 to facilitate input of controls, selections or commands to device 1502 or to facilitate the transmission of food orders, payments or requests to a management system, a food preparation area or to a waiter/waitress.

Controller 1538 is similar to controller 438 described above. As will be described hereafter, device 1502 senses three dimensional measurements in sensing field 40, wherein controller 1438 alters the content of the projection field 44 by menus 1508 on the table 1506. Based upon the sensed movement of objects or structures, modifiable mediums, contained within sensing field 40. The content of projection field 44 is altered to provide an augmented entertainment system as well to facilitate the ordering of food by customers.

FIGS. 21 and 22 illustrate the content of projection field 44 on and over the surface of table 1506 based upon signals received from sensor 30 and sensing field 40. As shown by FIG. 21, based upon signals received from sensor 30, controller 1538 may determine or detect the presence of customers and automatically direct projector 32 to project menus 1508 onto table 1506 or automatically reorder drinks for customers based on arm and glass position. As further illustrated by FIG. 21, based upon signals from sensor 30, controller 1538 may further identify the presence of a child's food package 1510 and/or an associated toy 1512 provided in the toy package 1510. For example, in one implementation, three dimensional measurements of package 1510 or toy 1512 may be compared to predefined three dimensional measurements to identify package 1510 or toy 1512. In other implementations, package 1510 and/or toy 1512 may include a barcode, quick code or other graphical code that may be read in sensed by sensor 30. In yet other implementations, package 1510 and/or toy 1512 may include an RFID tag which is sensed by an RFID sensor associated with sensor 30 or mounted to or otherwise provided beneath table 1506, wherein signals are transmitted to controller 1538, in a wired or wireless fashion, the signals indicating the presence of package 1510 or toy 1512. In response to the identified presence of package 1510 or toy 1512, controller 1538 may generate control signals directing projector 32 to project projected content 1516 onto toy 1512 or onto the surface of table 1506. In one implementation, the projected content, as part of projection field 44, may facilitate imaginative play with toy 1512 or may otherwise entertain the person or child who purchased the child food package 1510.

FIG. 22 illustrates changes to the content of projection field 44 by projector 32 in response to control signals from controller 1538 based upon changes in three dimensional measurements received from sensor 30 and sensing field 40. As shown by FIG. 22, a customer may touch or select certain portions of the project menus 1508, wherein such customer gestures or manipulations, representing selections or choices, are sensed by sensor 30 and transmitted to controller 1538. Based upon such customer gestures or manipulations, controller 1538 directs projector 32 to alter the content of projection field 44. In the example illustrated, controller 1538 causes projector 32 to project a different alternative menu 1520. In the example illustrated, controller 1538 causes projector 32 to further project depictions of possible examples or choices 1524 from the respective menus in response to the customer selecting such choices on one of the projected menus by touching or waving over an item on the projected menu 1520. As a result, customer may see visible projections of the food and content of the food that may be chosen. In one implementation, upon completion of the meal, controller 1538A further project an invoice or bill onto the surface of table 1506, wherein the customer may touch a projected keypad or keyboard to enter credit card payment information and complete a transaction.

As further illustrated by FIG. 22, sensor 30 may take three dimensional measurements of the toy 1512, indicating the orientation and positioning of toy 1512 or multiple such toys 5012. Based upon such signals from sensor 30, controller 1538 may alter the content of projection field 44 to further facilitate imaginative play with toy 1512. In the example illustrated, in response to repositioning of toy 1512 or other modification of a state, shape or the like of toy 1512, controller 1538 causes projector 32 to project a different projected content 1524 onto surface 1506.

In one implementation, sensor 30 may additionally sense the positioning of any actual food items on table 1506, such as food item 1526, wherein controller 1538 utilizes the determined positioning and size of food item 1526 to control the location on table 1506 at which projected image or content 1524 is projected. In one implementation, the projected content 1524 may additionally or alternatively interact with the actual food item 1526. For example, the projected content 1524 may comprise a mouth, figurine, animal or character attempting to consume the food item 1526, to encourage the child to also fully consume food item 1526 or to at least try or take a bite of food item 1526. For example, in one implementation, as a child takes a spoonful of green beans or mashed potatoes, as sensed by sensor 30, controller 1538 may project worms or other creatures crawling out of the newly created opening or indentation in the food resulting from removal of the portion of the food that was consumed. In one implementation, based upon the sensed or determined consumption of food item 1526, as sensed by sensor 30, controller 1538 may direct projector 32 to project new content or differing content, such as a cartoon or the like, to reward the child as he or she eats food item 1526. In one implementation, based upon the sensed or determined consumption of food item 1526, as sensed by sensor 30, controller 1538 may direct projector 32 to project additional features or capabilities for the one or more toys 1512. As a result, system 1500 may encourage children to eat all their food or to eat more healthy or nutritious food items of the meal which might otherwise be ignored by the child.

Figure 23:
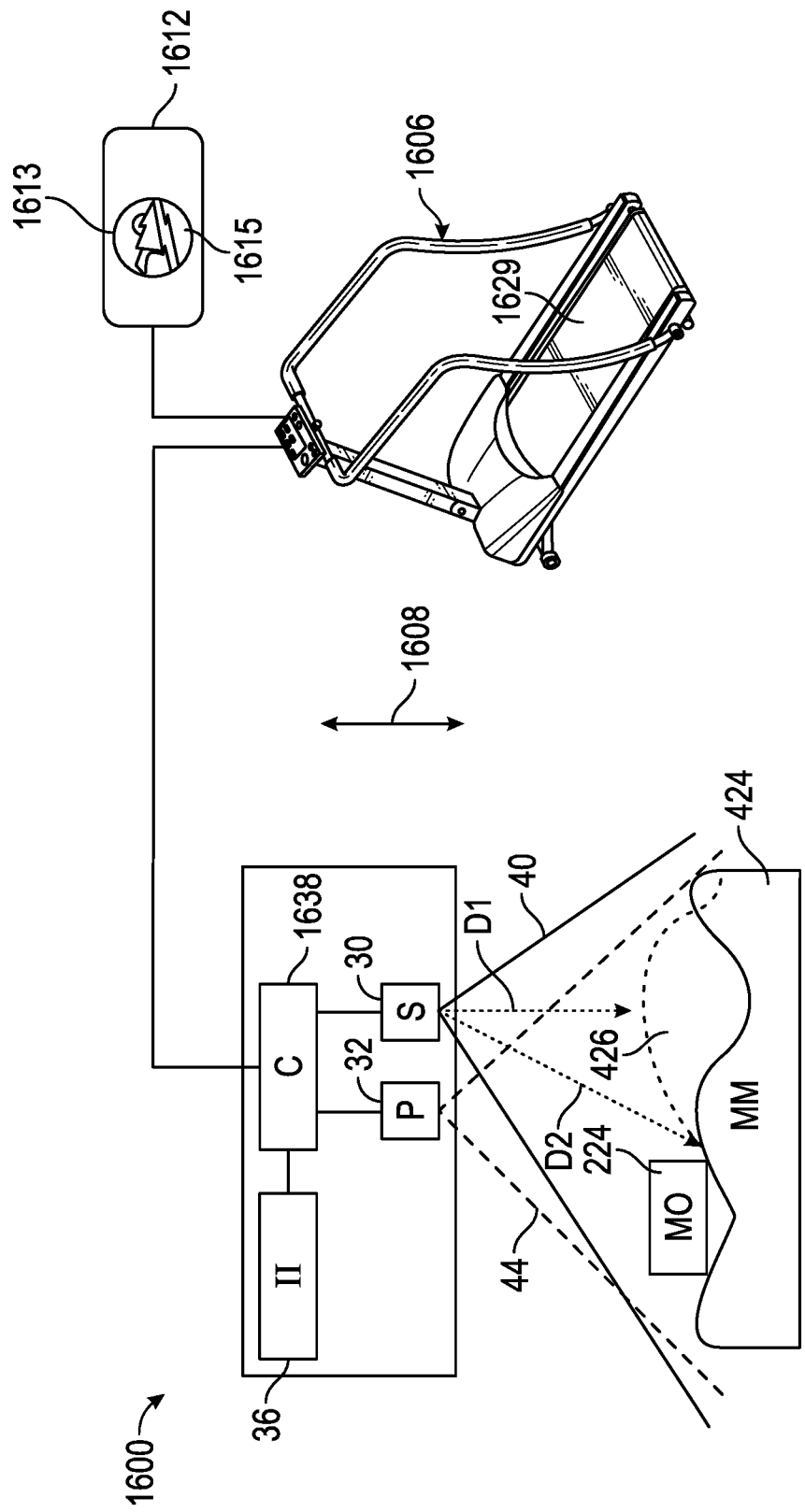
FIG. 23 is a schematic diagram of an example exercise simulation building system.

FIG. 23 schematically illustrates an example exercise simulation building system 1600. Simulation building system 1600 is similar to interactive imaging and sensing system 420 described above except that system 1600 is configured to generate a train simulation for an exercise apparatus 1606, an example of which is shown in FIG. 23. In the example illustrated, projector 32 projects projection field 44 over and on top of moldable medium 424. Sensor 30 senses three dimensional measurements across and within field 40. As the user manipulates moldable medium 424 and molded moldable medium 424, the changes are detected by sensor 30. In the example illustrated, the profile or shape of moldable medium 424 may be used to correspond to the simulated terrain for an exercise script which is transmitted or otherwise provided to exercise apparatus 1606 via transceiver 34 (described above) or by a different wired or wireless connection. In effect, manipulation of moldable medium 424 serves as an input for generating an exercise terrain over which a person may traverse when utilizing exercise apparatus 1606. In one implementation, additional inputs received through input interface 36 may direct controller 1638 to control projector 32 to add, subtract or change vegetation, buildings or other structures being projected onto moldable medium 424.

Exercise apparatus 1606 is illustrated as a treadmill which may actuate or move between different vertical inclinations. In the example illustrated, the timing at which the treadmill changes between the different vertical inclinations (as indicated by arrows 1608) is controlled by changes in the simulated train of an exercise script generated by controller 1638. In one implementation, the exercise script may comprise C-Safe language. In one implementation, exercise apparatus 1606 further comprises a display 1612, wherein display 1612 presents a virtual landscape or terrain 1613, and a virtual running path 1615, which is based upon the sensed shape and configuration of moldable medium 424 and the vegetation, rocks or other additions projected onto moldable medium 424 as input and selected by the user using input interface 36. In other implementations, a person generating the exercise simulation may position one or more movable objects, such as movable object 1620 onto or within moldable medium 424. In such an implementation, the size, shape and positioning of the lobby 1620 is sensed by sensor 30 and serves as a basis for the addition of a virtual object, structure, building or the like to the virtual landscape be presented on display 1612, wherein the person exercising runs through the virtual landscape 612 and wherein changes in the inclination of the exercise apparatus 1606, such as changes in the inclination of the treadmill belt 1624 varies based upon changes in the elevation at different points in the exercise route or path through the virtual landscape.

Figure 24:
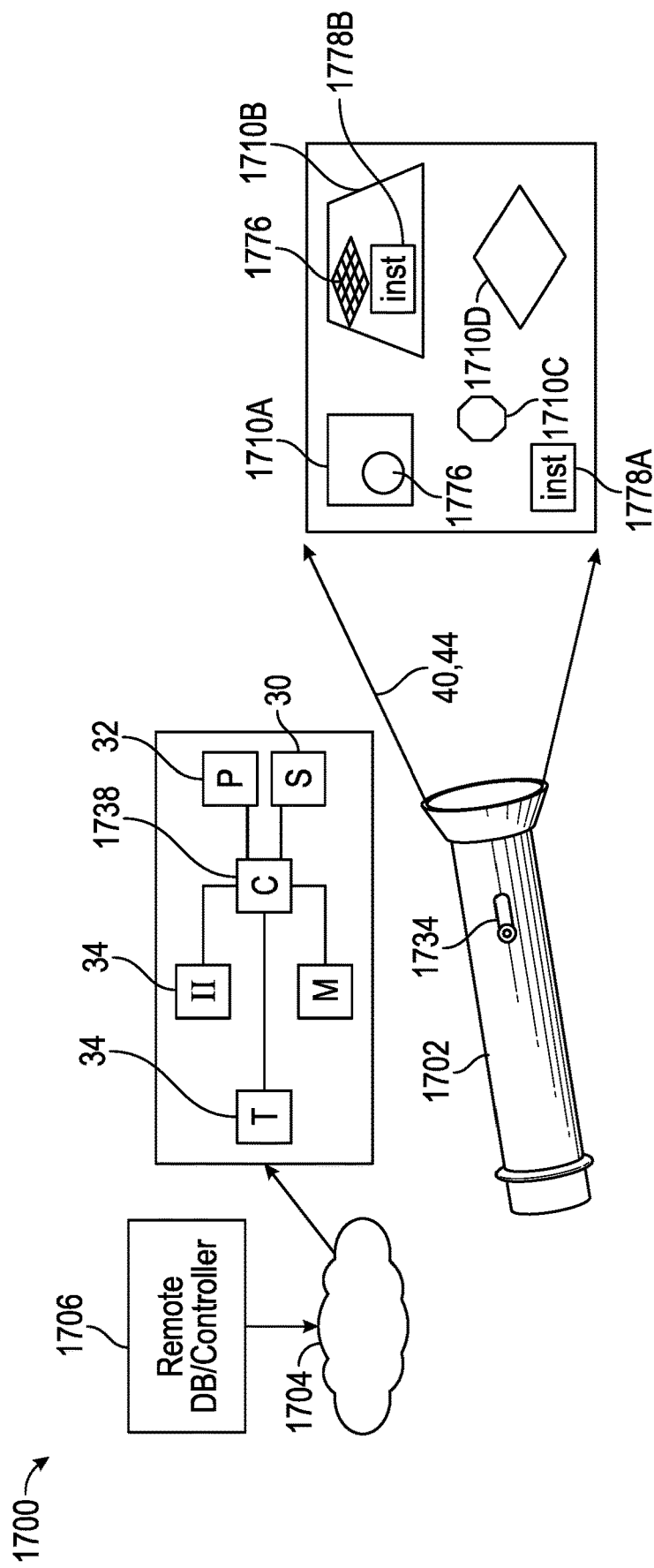
FIG. 24 is a schematic diagram of an example interactive imaging and sensing system.
Figure 25:
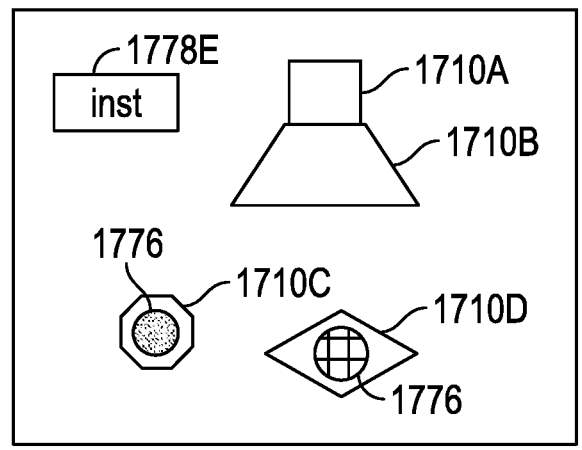
FIGS. 25 and 26 are schematic diagrams of the example interactive imaging and sensing system of FIG. 24.
Figure 26:
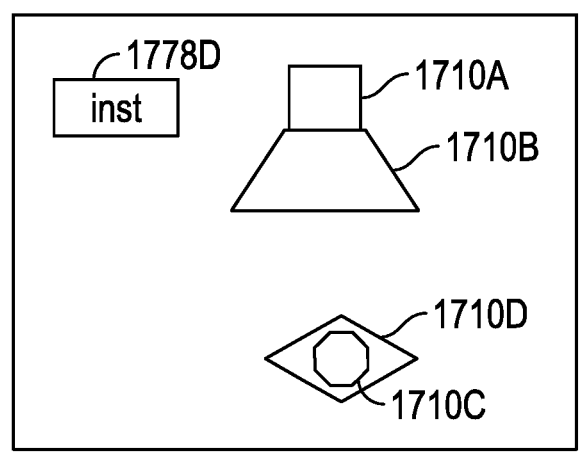

FIGS. 24, 25 and FIG. 26 schematically illustrate an example interactive imaging and sensing system 1700. System 1700 comprises interactive imaging and sensing device 1702. Device 1702 is configured to project a projection field 44 which coincides with a three-dimensional sensing field 40. In one implementation, device 1702 comprises a portable device or a handheld device, similar to a handheld flashlight. In one implementation, device 1702 may comprise bulb 600 described above. In other implementations, device 1702 may comprise a permanent structure that is mounted to a ceiling, wall or other support.

As schematically shown in FIG. 24, in the example illustrated, device 1702 comprises sensor 30, projector 32, transceiver 34, input interface 36 and controller 1738. Sensor 30, projector 32, transceiver 34 and input interface 36 are described above. Sensor 30 and projector 32 form sensing and projection field 40, 44 which, in the example illustrated, substantially coincide with one another. Transceiver 34 facilitates communication across a network 1704, such as a wide area network or a local area network, between controller 1738 and a remote database/controller 1706. The remote database/controller 1706 may contain instructions or other data for axis by controller 1738. In some implementations, at least some of the calculations or processing may be carried out at the remote controller 1706, reducing computing or processing burdens upon controller 1738 contained within the portable handheld unit or device 1702.

Controller 1738 is similar to controller 438 described above except the controller 1738 is specifically configured or programmed to sense the positioning and/or other characteristics of movable or modifiable mediums during a process and to change in control the content of a projection field to prompt a person carrying out a process through the various steps or actions, assisting the person with carrying out the process. As each step is completed through the manipulation of movable or modifiable mediums, the change in the state or positioning of such modifiable mediums is sensed by sensor 30. As a result controller 1738 changes the projected content of projection field 44, being projected over the movable mediums, to further instruct the person.

FIG. 24 illustrates projector 32 of device 1702 projecting a projection field 44 over and encompassing modifiable mediums 1710A, 1710B, 1710C and 1710D (collectively referred to as modifiable mediums 1710) which are also contained within the sensing field 40 of sensor 30. Controller 1738 detects and distinguishes or identifies each of the modifiable mediums 1710. In one implementation, the modifiable mediums 1710 comprise ingredients, parts or components of an assembly or mixture. Based upon preprogrammed instructions for a particular process, controller 1738 utilizes the identification of the individual mediums 1710 and their positions as well as the current state of the process being carried out to control the content of projection field 44 to prompt a direct manipulation of the recognized objects or modifiable mediums 1710 within the projection field. In one implementation, the content of projection field 44 may comprise individual illuminations or markers 1776 projected directly on top of or adjacent the identified mediums 1710. The illuminations or markers 1776 may have a shape, size, color or pattern which indicates to a person that these parts are to be manipulated or moved next in the process. In one implementation, the contents of projection field 44 may additionally include projected instructions 1778A and 1778B which are projected directly on the parts or mediums 1710 or which are projected in regions adjacent to such mediums 1710. In the example illustrated, markers 1776 and instructions 1778A, 1778B prompt the person to connect or mix mediums 1710A and 1710B.

FIG. 25 illustrates the repositioning mediums 1710A and 1710B as well as the modified content of projection field 44 based upon the sensed repositioning of mediums 1710A and 1710B as detected by sensor 30. As shown by FIG. 25, controller 1738 directs projector 32 to project markers 1776 onto the next parts or components that are to be manipulated are used. The type of manipulation may be indicated by the color, shape, size or pattern of such different markers 1776 projected onto the different components 1710. As shown by FIG. 25, projection field 44 may include additional projected content such as projected instructions 1778C. Such instructions may be different from instructions 1778A and 17786 shown in FIG. 24 due to the different state of the process or method through which system 1700 is guiding the user or person.

FIG. 26 illustrates the repositioning of mediums 1710C and 1710D as well as the modified content of projection field 44 based upon the sensed repositioning of mediums 1710C and 1710D as detected by sensor 30. As shown by FIG. 26, controller 1738 directs projector 32 to change the content of projection field 44 in response to completion of the suggested or instructed manipulation shown in FIG. 25. In the example illustrated, projector 32 is directed to project instructions 1778D which are different than the instructions 1778A-1778C due to the change in the state of the assembly.

In one implementation, mediums 1710 may comprise different parts of an assembly, wherein system 1700 guides a person through the assembly or disassembly of such parts with respect to one another. For example, in one implementation, the assembly may comprise an engine, a tire assembly or the like, wherein the series of different content projected by projection field 44 onto the parts of the assembly, such as onto the engine or the existing tire assembly, guides a person through the assembly or disassembly of the engine, tire assembly or the like. For example, the projection field 44 may specifically identify which parts or components should be manipulated next by the user in the process or method of repairing an engine, changing a tire or the like. If mistakes are made, the content of the projected image 44 may also address such mistakes, prompting the person or instructed to correct such mistakes such as by illuminating incorrectly positioned or assembled parts and instructing further manipulation of such incorrectly positioned or assembled parts.

In another implementation, mediums 1710 may comprise ingredients or sources of ingredients for food preparation. In such an implementation, the changing content of projection field 44 may sequentially indicate the order at which different ingredients are to be combined and what actions are to be taken by the different ingredients to complete different stages of food preparation. The changing content of projection field 44 increments through the process based upon the sensed state of the food preparation process as sensed by sensor 30. For example, in one implementation, system 1700 may direct or guide a person in the preparation of a food item such as lasagna, cookies or other complex recipes.

In another implementation, system 1700 may be employed as part of a fast food environment, wherein system 1700 directs a food preparer in the assembly of a food item being prepared according to specific preferences of a customer. For example, as new food orders are received, a food preparer may be presented with a different series of projected content over his or her work area, wherein the projected content guides a person through preparation of a food item that meets the particular customized food request of a customer. By way of example, the customer may request that a hamburger include pickles and ketchup, but omit onions. The projected image may include illuminations projected directly onto the pickles container source and ketchup dispenser, but not the container dispenser of onions, indicating, to the food preparer, what ingredients are to constitute the hamburger being assembled. The projected image on the next customer order may differ for the next hamburger from a different customer which may include different requested ingredients.

Figure 27:
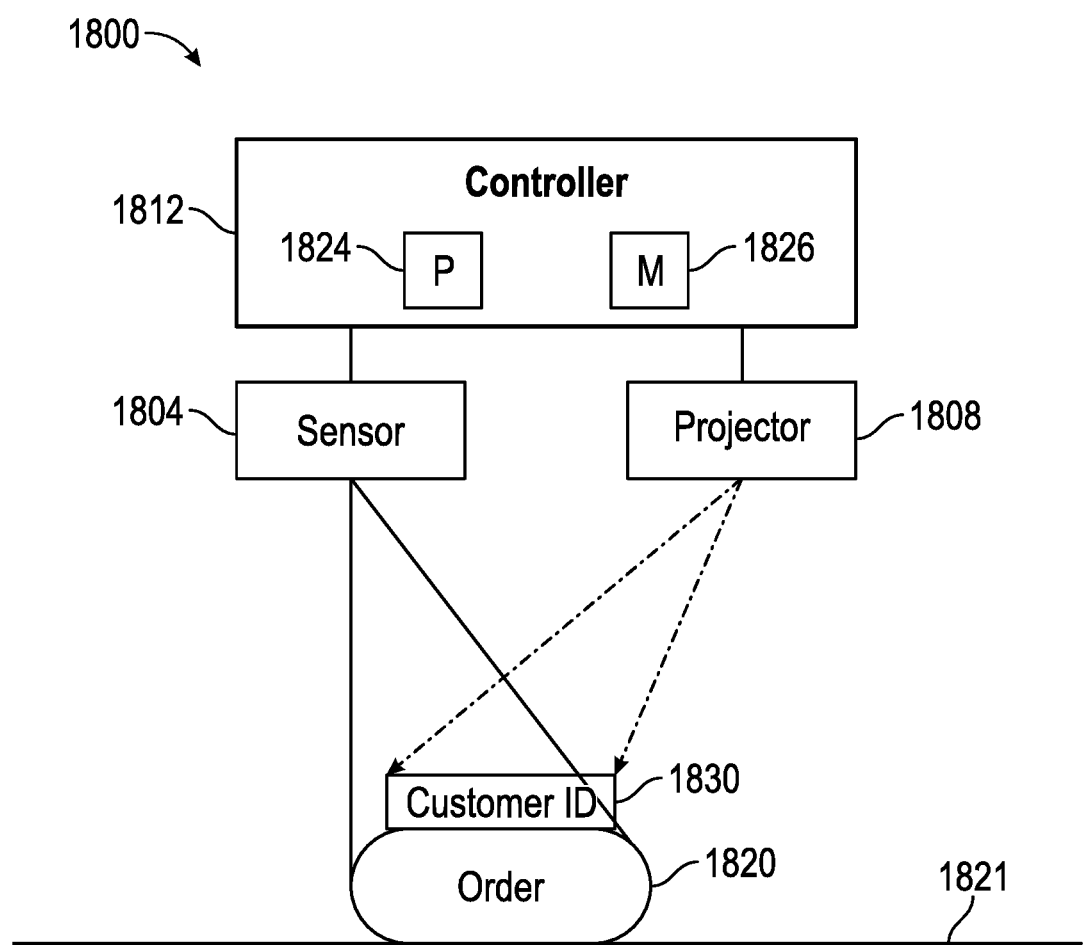
FIG. 27 is a schematic diagram illustrating portions of an example order to customer linking system.

FIG. 27 is a diagram schematically illustrating portions of an example order to customer linking system 1800. Customer orders, such as food or drink orders, repairs or the like may go through various stages of preparation or action prior to being completed. Upon completion, such customer orders may be queued, ready for pickup by the customer. During such stages and upon completion, it may be important to link or associate the customer order to the customer who requested the order so as to avoid confusion and mixups with other customer orders. Many existing methods for associating a customer order to a particular customer are outdated, unwieldy, tedious and potentially unreliable. For example, many food orders at a restaurant, diner or coffee shop are often identified with a paper slip or a handwritten marking placed upon the container or bag containing the food order.

The example order to customer linking system 1800 links or associates a customer order to a particular customer in a simple, cost-effective and more reliable manner. The example order to customer linking system 1800 links or associates a customer order to a particular customer by sensing the position of the order, tracking the position of the order, and projecting a customer identification image based upon the sensed position of the order. As a result, movement of an order through the various stages or upon completion may be tracked by processing unit using a sensor and may be automatically linked to a particular customer with a projected customer identification image. Such order to customer linking may be less prone to human error and may alleviate or reduce any specialized containers or permanent physical markings on the order or its container, tray or the like.

Order to customer linking system 1800 comprises sensor 1804, projector 1808 and controller 1812. Sensor 1804 comprise a sensor configured to sense a position of an order 1820. Examples of an order include, but are not limited to, an order for food, an order for a drink or drinks, a repair job or any other project or task which may undergo multiple stages of construction, formation, assembly or repair or any completed order that may be queued, waiting pickup by the customer who requested the order.

Sensor 1804 may comprise a camera, an infrared or other human and perceptible sensor, a contact sensor or the like. In one implementation, sensor 1804 comprises a three-dimensional sensor that projects a three-dimensional sensing field. In some implementations, sensor 1804 may be focused on a region of a counter, table, worksurface or the like. In some implementations, sensor 1804 may be movable or repositionable so as to move with movement of order 1820, so as to maintain order 1820 within the focus or sensing field of sensor 1804. In some implementations, sensor 1804 may comprise multiple individual sensing elements which collectively have a sensing field or area sized to accommodate movement of the order 1820. In some implementations, sensor 1804 is similar to the above described sensors.

Projector 1808 is similar to the above described projectors. Projector 1808 is configured to project a human perceptible or visible image. In some implementations, projector 808 is movable such that the projected image may be moved as order 1820 is moved. In some implementations, projector 1808 comprises multiple individual projection elements, wherein the individual projection elements may be separately controlled and actuated such that different projection elements may project the customer identification image as the order 1820 is moved from place to place. In some implementations, projector 1808 may have a projection field sized to accommodate various positions or movements of order 1820, wherein the larger projection field includes a customer identification image. Customer identification image may be relocated within the projection field as the order moves or is moved within the projection field. Said another way, the particular relative location of the customer identification image may change within the overall larger projection field or image to accommodate different positions of the order 180 within the overall larger projection field. In some implementations, sensor 1804 and projector 1808 be incorporated into a single device as described above.

Controller 1812 controls sensor 1804 and projector 1808. Controller 1812 comprises processing unit 1824 and processor-readable medium 1826. Processing unit 1824 carries out instructions provided in medium 1826. Medium 1826 comprises a non-transitory processor-readable medium containing instructions for directing processing unit 1824 to: (1) sense the position of order 1820 and outputting control signals actuating sensor 1804; (2) associate a particular customer to order 1820 and (3) output control signals to projector 1808 to project the customer identification image identifying the customer, wherein the location of the customer identification image being projected is based upon sensed positioning of the order 1820.

In some implementations, the container, tray or other support structure containing the order 1820 or the product of the order itself may include an identification marker, wherein a waiter, barista or other person entering a request from a customer may provide input to controller 1812 identifying the order 1820 and associating it (and its identification marker) to the customer who requested the order. In some implementations, customers may be input to controller 1812 in a particular order, such as the chronological order of receipt of the request from different customers, wherein customers are automatically assigned to different orders also in the corresponding chronological order of the appearance of an order at a particular workstation or stage or the appearance of a particular order at a customer pickup area.

For example, during a particular period of time, controller 1812 may receive input for order requests for orders 01, 02 and 03 for customers C1, C2 and C3, respectively, in such order. The first order 01, amongst the three orders, moving through various stages and/or completed is presumed by controller 1812 to correspond to the first order request for order 01 input into the system 1800 for customer C1. The next order 02, amongst three orders, moving through the various stages and/or completed is completed is presumed by controller 1812 to correspond to the second order request input into system 1800 for customer C2, and so on. In some implementations, as the first order 01 moves through various stages, and sensed at various stage locations or worksurfaces 1804, controller 1812 outputs control signals to projector 1808 causing projector 1808 to project a customer identification image 1830 for customer C1 onto or adjacent (alongside) to the order as it moves from stage to stage. In some implementations, upon completion of the first order 01, such as in response to the first order 01 being placed upon a customer pickup counter 1821, as sensed by sensor 1804, controller 1812 may output control signals causing projector 1808 to project a customer identification image 1830 for customer C1 onto or adjacent (alongside) to the completed order 01 at the customer pickup area and as the order 01 is moved or shuffled along at the customer pickup area. Controller 1812 further identifies, based upon signals from sensor 1804, when the particular order 1820 (tracked and associated to a particular customer by controller 1812) has been picked up by the customer. Upon pickup completion, controller 1812 may automatically cease further sensing or tracking of the order and further projection of the customer identification image.

In some implementations, the customer identification image (customer ID) 1830 may comprise the initials or the name of the customer. In some implementations, the customer identification image may additionally include or alternatively include a customer identification number. In some implementations, the customer identification image 1830 may additionally comprise an amount owed to be charged for the order, such as where the customer is to pick up the completed order and make payment. In some implementations, the customer identification image 1830 may additionally comprise a welcoming phrase or slogan such as "have a great day!", "Thank you for shopping at [name of restaurant, diner or the like]" or the like. In some implementations, the customer identification image 1830 may include a follow-up offer for additional services, food, drinks or the like.

Figure 28:
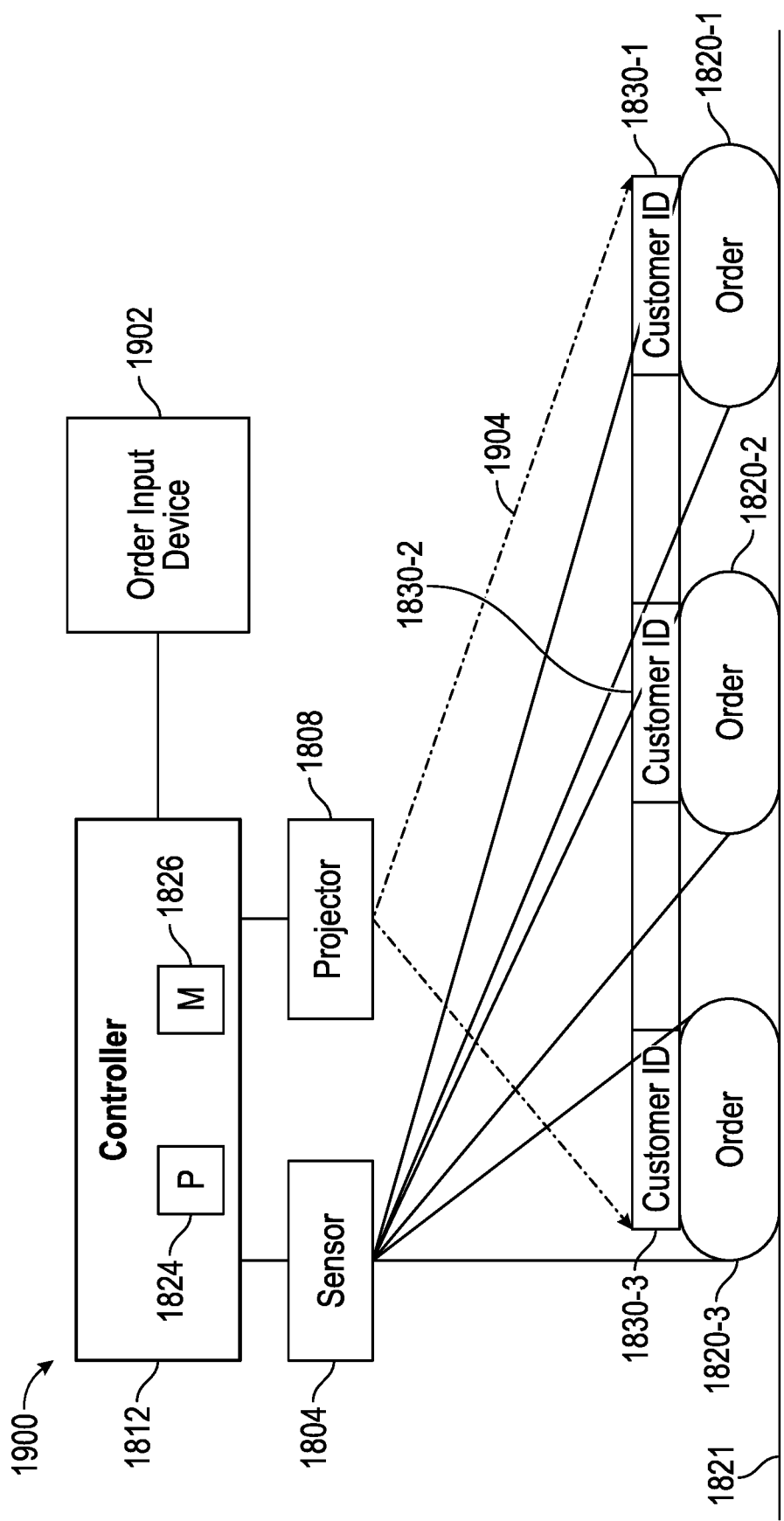
FIG. 28 is a schematic diagram illustrating portions of an example order to customer linking system.

FIG. 28 is a diagram schematically illustrating portions of an example order to customer linking system 1900. System 1900 may be one example of system 1800 described above. System 1910 currently tracks and visually links multiple different orders to multiple different customers. System 1900 is similar to system 1800 described above except that system 1900 is specifically illustrated as additionally comprising order input device 1902. Those components of system 1900 which correspond to components of system 1800 are numbered similarly.

Order input device 1902 comprises a device by which a person taking orders, such as a waitress, waiter, barista, counter clerk or the like may enter or input a customer order for a good or service. Order input device 1902 may further receive input from an order preparer (which may or may not be the same person as a person took the customer order) indicating completion of the order. In some implementations, order input device 1902 may comprise multiple separate input devices provided at different locations. For example, order input device 1902 may comprise a first input device adjacent a cash register or counter and a second input device proximate to a preparation region where he completed order would be placed for relocation to a customer order pickup region are proximate to the customer pickup region itself.

As shown by FIG. 28, upon receiving indication of completion of the order from order input 1902, controller 1812 may output control signals to sensor 1804 initiating sensing by sensor 1804 to identify and locate the new completed order placed upon pickup region 1821. Once the new order and its position has been identified from the signals received from sensor 1804, controller 1812 may output control signal to projector 808 to project an overall image 1904 that includes a customer identification image identifying the customer associated with the newly completed order. Each time that an order is indicated as being newly completed (from order input device 1902), this process is repeated.

As shown by FIG. 28, customer pickup region 1821 may include an accumulation of multiple orders 1820-1, 1820-2 and 1820-3, each order ready for pickup by the respective customers. The overall larger projection 1904 may comprise multiple customer identification images 1830-1, 1830-2 and 1830-3 projected onto or nearby the respective orders 1820-1, 820-2 and 1820-3. As new orders are placed upon region 181, such orders may be further moved into closer proximity with one another. Despite such movement, controller 1812 tracks new positions of the orders using signals from sensor 1804 and outputs control signals adjusting the overall projection 1904 to correspondingly move the customer identification images 1830. Signals from sensor 1804 may further be output when a particular completed order has been picked up. In response, controller 1812 may alter the overall projection 1904 to remove the particular customer identification image from the larger projection 1904.

As shown by FIG. 29, controller 2038 comprises a processing unit 2024 and a processor-readable medium 2026. Medium 2026 comprises a non-transitory computer-readable medium containing instructions, code or other circuitry programming to direct the operation of processing unit 2024. In the example illustrated, such instructions cause processing unit 2024 to output signals projector 32, causing projector 32 to project a reorder zone image 2060 onto the surface 2006. Sensor 30 is controlled or located such that field 40 focuses on the projected reorder zone 2060. Sensor 30 may detect the movement of a fluid vessel or container 2062 (glass, mug, pitcher or the like) containing a fluid 2063 into or over the reorder zone 2060 by a customer, such as customer 2066-1. Based upon the angle of movement of the container 2062, the signals from sensor 30 may further indicate which customer, 2066-1 or 2066-2, initiated such a request.

Figure 29A:
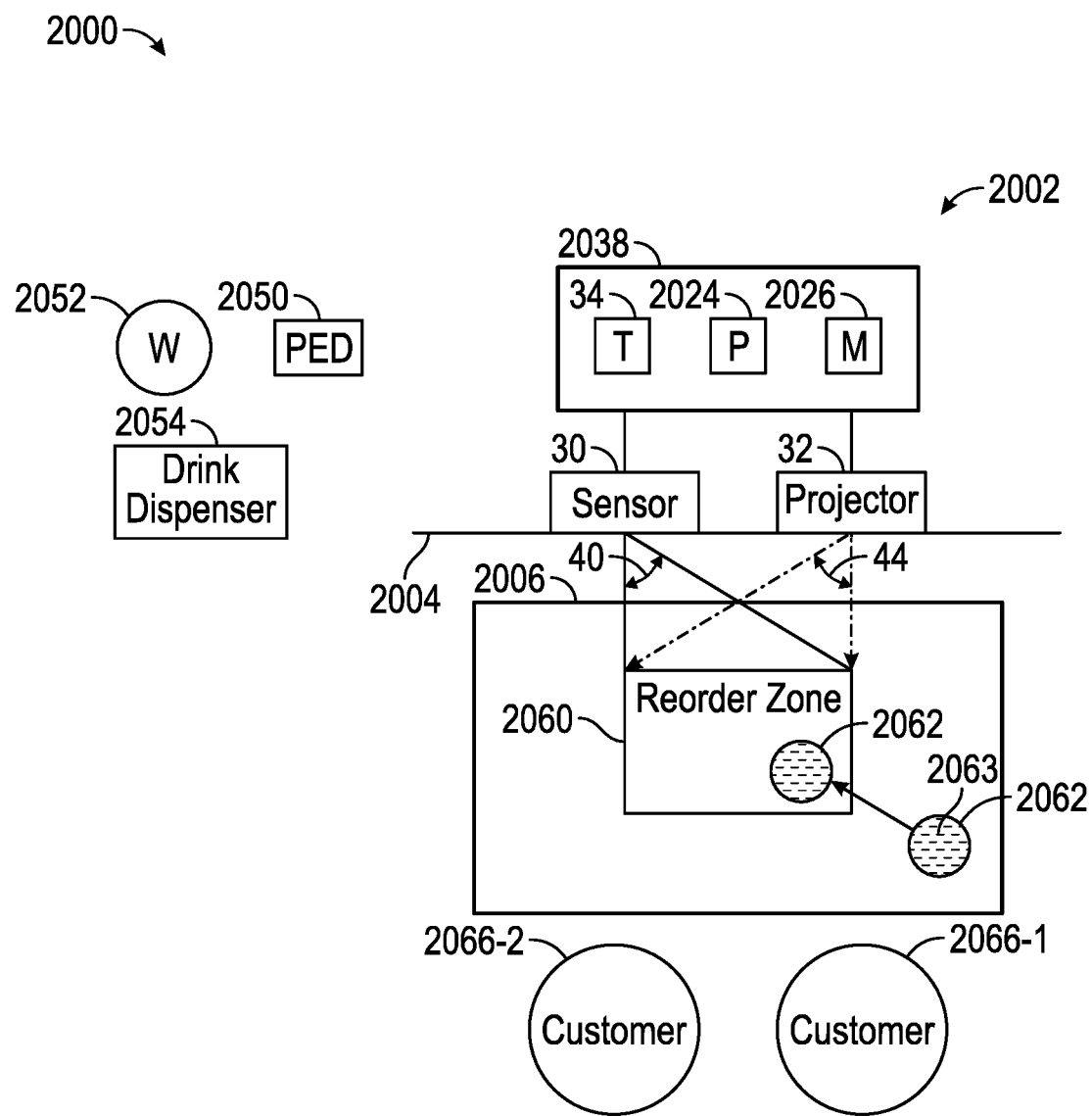
FIG. 29A is a schematic diagram illustrating an example customer ordering system during an initial ordering phase.
Figure 29B:
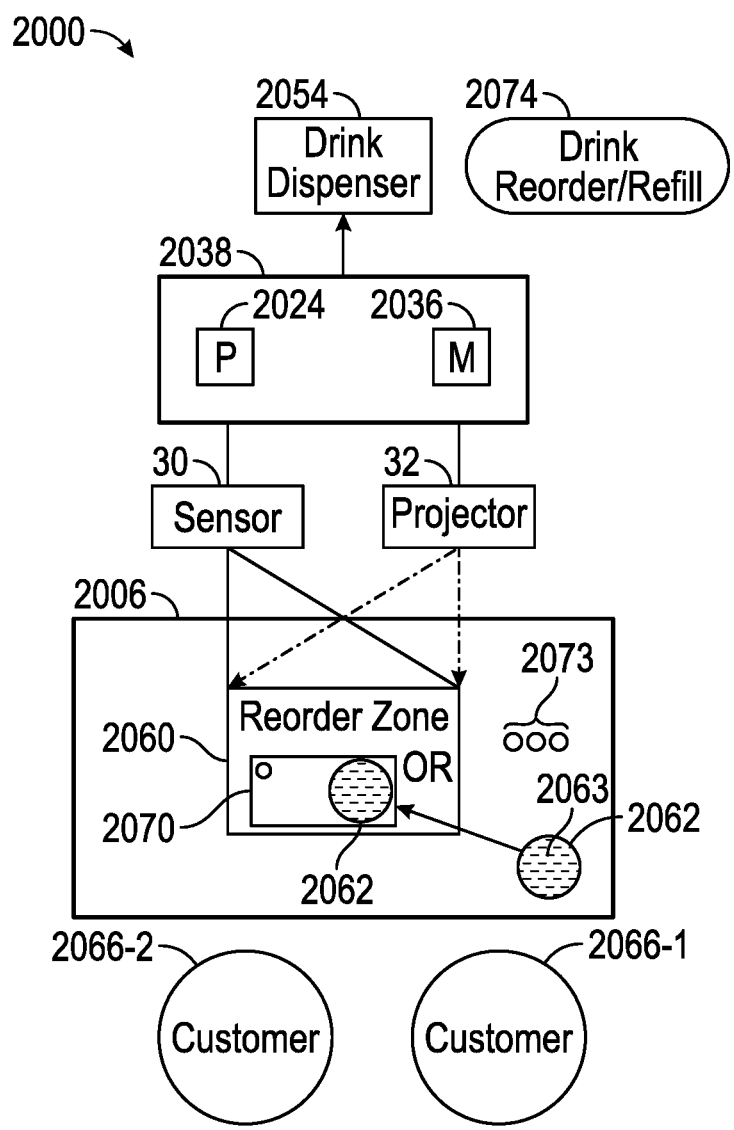
FIG. 29B is a schematic diagram of the example customer ordering system of FIG. 29A during an option selection and order transmission phase.

As shown by FIG. 29B, in response to such detected movement of container 2062 into reorder zone 2060, controller 2038 may output control signals to projector 32, causing projector 32 to additionally or alternatively project an option list 2070 onto surface 2006. The option list 2070 may present a list of reorder drink options for selection. In some implementations, the option list may include selections limited to prior types of drinks previously provided to those customers adjacent to reorder zone 2060. For example, controller 2038 may receive information from the waiter/waitress from a prior order of drinks. This information may be used to partially limit the number of options presented on list 2070. This especially may be the case where the request is for a refill of soda or the like. In some implementations, the option list 2070 may include additional drink offers or specials or drink upgrade suggestions. In the example illustrated, the particular type of drink (kind of soda, kind of beer, kind of wine of the like) may be selected by the customer 2066-1 simply repositioning the drink container 2062 over the particular selection, wherein sensor 30 may identify the selection based upon the positioning of the drink container 2062. In other implementations, a particular selection from option list 2070 may be made by the customer 2066-1 manually touching or pointing to the particular selection, wherein such touching or movement is captured by sensor 30.

Upon receiving the particular selection, as detected by sensor 30, controller 2038 automatically transmits a drink reorder/refill request 20742 drink dispenser 2054 and/or the personal electronic device 2050 of the waiter/waitress 2052

(shown in FIG. 29A). As a result, reordering of drinks or refills (or original drink orders) may be more quickly made, entered and delivered. The customer wishing to order a drink, reorder a drink or request a refill need not wait for an available waiter/waitress or wait for the assigned waiter/waitress to attend to the customer. In some circumstances, initial drinks for customers (prior to the ordering of a meal) may be automatically input and delivered to the customer when the customer is ready to make such an order, rather than the waiter/waitress need to wait for the customer selection. Although system 2000 has been illustrated described with respect to the ordering of drinks, system 2000 may likewise accommodate the ordering of appetizers and food items. Overall, system 2000 facilitates more efficient ordering and delivery of food and/or drinks.

In some implementations, reorder zone 2060 may be provided by permanent mat, marking or other indicia on surface 2006, wherein projector 32 does not project reorder zone 2060. In some implementations, the reorder zone 2060 projected onto surface 2006 may additionally include food or drink specials or a menu. In some implementations, the ordering or reordering of a drink, refill or the like may be in response to a particular token or other item (other than an empty or partially empty fluid container 2062) being moved into a reorder zone, such as reorder zone 2060. For example, in some implementations, different types of drinks may be associated with different movable tokens 2073 residing on surface 2006, wherein movement of a particular token 2073, selected by the customer, into the reorder zone 2060 may indicate a request for a refill or order for the particular type of drink associated with the token. In such an implementation, the projection of the options list 2070 may be omitted.

Although the claims of the present disclosure are generally directed to a, the present disclosure is additionally directed to the features set forth in the following definitions.

1. An apparatus comprising:
    a movable medium;
    a projector to project a projection field onto and about the movable medium; and
    a sensor to sense the projection field;
    an input interface outside the projection field; and
    a controller that adjusts the projection field being projected onto the movable medium based upon a first input from the sensor and a second input from the input interface.
2. The apparatus of definition 1 further comprising a second input interface outside the projection field, wherein the movable medium is movable in response to inputs to the second interface.
3. The apparatus of definition 1, wherein the movable medium comprises a first movable medium and a second movable medium, wherein the controller is to distinguish between the first movable medium and the second movable medium based upon signals from the sensor and wherein controller adjusts the projection field being projected onto the movable medium differently based upon positioning of the first movable medium as compared to positioning of the second movable medium.
4. The apparatus of definition 1, wherein the movable medium comprises a moldable mass of material.
5. The apparatus of definition 4, wherein the movable medium additionally comprises a three-dimensional structure supportable by the moldable mass of material.
6. An apparatus comprising:
    a projector to project a projection field in a first direction;
    a first three-dimensional sensor to sense the projection field;
    a second three-dimensional sensor to sense in a second direction opposite direction; and
    a controller to output control signals adjusting characteristics of the projection field based upon signals from the first three-dimensional sensor and the second three-dimensional sensor.
7. An apparatus comprising:
    a projector to project a projection field;
    a three-dimensional sensor to acquire three-dimensional field measurements within the projection field;
    a controller to:
        recognize and distinguish between different objects within the projection field based upon the three-dimensional field measurements within the projection field;
        control the projector to alter the projection field based upon the recognized objects within the projection field and their positioning within the projection field.
8. The apparatus of definition 7, wherein the controller is to control the projector to alter the projection field in response to changes in positioning of the recognized objects so as to prompt or direct manipulation of the recognized objects within the projection field.
9. The apparatus of definition 8, wherein the recognized objects comprise parts of an assembly and wherein the controller controls the projector to alter the projection field based upon sensed changes in positioning of the parts so as to instruct assembly of the assembly or disassembly of the assembly.
10. The apparatus of definition 8, wherein the recognized objects comprise ingredients to a recipe and wherein the controller controls the projector to alter the projection field based upon sensed changes in the positioning of the ingredients so as to instruct carrying out of the recipe.
11. The apparatus of definition 8, wherein the recognize objects comprise anatomical structures and/or surgical/medical tools and wherein the controller controls the projector to alter the projection field based upon changes in the anatomical structures and/or changes in positioning of the surgical/medical tools to instruct carrying out of a medical procedure on the anatomical structures.
12. The apparatus of definition comprising a handheld unit comprising, the projector and the three-dimensional sensor, the handheld unit being manually positionable to locate the projection field onto the objects to be recognized.
13. The apparatus of definition 12, wherein the handheld unit further comprises the controller.
14. The apparatus of definition 13, wherein the handheld unit comprises a transceiver to communicate with the controller in a wired or wireless fashion, the controller being remotely located with respect to the handheld unit.
15. An apparatus comprising:
    a projector to project a projection field;
    a three-dimensional sensor to acquire three-dimensional field measurements within the projection field;
    a controller to:
        compare three-dimensional field measurements of a surface of an object within the projection field to corresponding target three-dimensional measurements for the object; and
        control the projector to project onto the surface of the object based upon the comparison.
16. The apparatus of definition 15, wherein the controller controls the projector to project a color onto the surface, the color being based upon the comparison.
17. The apparatus of definition 15, wherein the controller controls the projector to project a target edge for the object onto the object.

18. An apparatus comprising:
a first projector;
a first three-dimensional sensor to sense a projection field of the first projector;
a second projector;
a second three-dimensional sensor to sense a projection field of the second projector;
at least one controller in communication with the first projector, the first three-dimensional sensor, the second projector and the second three-dimensional sensor, wherein the controller controls the first projector based upon signals from the second three-dimensional sensor and controls the second projector based upon signals from the first three-dimensional sensor.

19. An apparatus comprising:
a display;
a three-dimensional sensor having a three-dimensional measurement field to sense a characteristic and/or positioning of a physical object in the field;
a controller to present a virtual object on the display, the virtual object corresponding to the physical object in the field, the controller to alter the virtual object on the display in real time response to a change in a characteristic and/or positioning of the physical object.

20. The apparatus of definition 19, wherein the physical object comprises a moldable mass of material.

21. The apparatus of definition 19, wherein the virtual object corresponding to the moldable mass of material comprises a virtual terrain such that manual manipulation of the moldable mass of material permits the user to manually alter the virtual terrain being displayed.

22. The apparatus of definition 21, wherein the controller presents a second virtual object on the display relative to the virtual terrain, the second virtual object not corresponding to any physical object in the field, wherein the apparatus further comprises an input interface outside of the field and wherein the controller alters a characteristic or positioning of the second virtual object based upon signals from the input interface.

23. The apparatus of definition 22, wherein the three-dimensional measurement field is to sense a characteristic and/or positioning of a second physical object in the field and wherein the controller presents a third virtual object on the display relative to the virtual terrain.

24. The apparatus of definition 23 further comprising a second input interface outside the field, wherein the controller alters a characteristic of the third virtual object on the display in response to signals from the second input interface.

25. The apparatus of definition 19 further comprising a user input interface interface outside of the field, wherein the controller alters a characteristic of the virtual object on the display in response to signals from the user input interface.

26. A food monitoring system comprising:
a food storage region;
a three-dimensional sensor to apply a three-dimensional field measurement to the food storage region;
a processing unit to:
identify an object within the food storage region based upon signals from the three-dimensional sensor;
determine a characteristic of the identified object; and
output a notification based upon the determined characteristic.

27. The food monitoring system of definition 26, wherein the processing unit identifies the object within the food storage region at different times to determine a residence time of the object within the food storage region and wherein the notification is based upon the determined residence time.

28. The food monitoring system of definition 27 further comprising at least one projector, wherein the processing unit is to control the at least one projector to project the notification onto the object.

29. The food monitoring system of definition 28, wherein the processing unit is to control the at least one projector to project a color onto the object, the color varying based upon a comparison of the determined residence time to at least one predetermined residence threshold.

30. The food monitoring system of definition 29, wherein the processing unit identifies a quantity of a type of food in the storage region based upon at least one of a size of the object containing or comprising the type of food and/or a number of other objects similar to the object in the food storage region that also container comprise the type of food, wherein the notification is based upon the quantity of the type of food in the food storage region.

31. The food monitoring system of definition 30, wherein the processing unit compares the identified quantity of the type of food in the storage region to a predefined threshold and automatically transmits a purchase request to a supplier for the type of food based upon the identified quantity of the type of food.

32. The food monitoring system of definition 30, wherein the processing unit generates a food purchase list based upon the identified quantity of the type of food.

33. The food monitoring system of definition 30 further comprising a projector, wherein the processing unit is to control the projector to project the notification onto the object.

34. The food monitoring system of definition 30, wherein the processing unit is to control the projector to project a color onto the object, the color varying based upon a comparison of the identified quantity of the type of food within the storage region to at least one predetermined quantity threshold.

35. The food monitoring system of definition 26, wherein the processing unit identifies an expiration date for food contained in the object based upon signals from the three-dimensional sensor and wherein the notification is based upon a comparison of a current date and the identified expiration date.

36. The food monitoring system of definition 35 further comprising a projector, wherein the processing unit controls the project to project the notification onto the object, the notification being based upon a comparison of the current date and the identified expiration date.

37. The food monitoring system of definition 35, wherein the notification projected onto the object has a color that varies depending upon a determined relationship between the current date and the expiration date.

38. The food monitoring system of definition 36, wherein the processing unit identifies the object at a first location within the food storage region at a first time and at a second location within the food storage region at a second time and wherein the processing unit determines that the object of the first location at the first time and the object of the second location at the second time are the same object.

39. The food monitoring system of definition 26 comprising a food cooling unit selected from a group of food cooling units consisting of a refrigerator and a freezer, wherein the food storage region is within the food cooling unit.

40. The food monitoring system of definition 26 further comprising at least one projector, wherein the processing unit controls the at least one projector to project the notification onto a surface proximate the food storage region.

41. The food monitoring system of definition 26, wherein the processing unit is further configured to:
   identify a second object within the food storage region based upon signals from the three-dimensional sensor;
   determine a characteristic of the second object, wherein the determined characteristic of the object comprises a nutritional characteristic of the object and wherein the determined characteristic of the second object comprises a nutritional characteristic of the second object, wherein the system further comprises at least one projector, wherein the processing unit controls the at least one projector to project a first projection onto the object based upon the determined nutritional characteristic of the object and to project a second projection, different than the first projection onto the second object based upon the determined nutritional characteristic of the second object.

42. The food monitoring system of definition 26, wherein the processing unit is further configured to:
   identify a second object within the food storage region based upon signals from the three-dimensional sensor;
   determine a characteristic of the second object, wherein the determined characteristic of the object comprises a nutritional characteristic of the object and wherein the determined characteristic of the second object comprises a nutritional characteristic of the second object and wherein the system further comprises:
   an input device to receive an identity of a person accessing the food storage region;
   a memory storing an objective of the person relating to food consumption; and
   at least one projector, wherein the processing unit is further configured to control the at least one projector to:
   project a first projection onto the object based upon the received identity of the person accessing the food storage region and the objective of the person accessing the food storage region; and
   project a second projection onto the second object based upon the received identity of the person accessing the food storage region and the objective of the person accessing storage region, the second projection being different than the first projection based upon different impacts of consumption of food associated with the first object towards the objective as compared to impacts of consumption of food associated with the second object towards the objective.

43. The food monitoring system of definition 42, wherein the processing unit directs the at least one projector to project a first color onto the first object and a second color, different than the first color onto the second object, the first color and the second color being based upon different impacts of consumption of food associated with the first object towards the objective as compared to impacts of consumption of food associated with the second object towards the objective.

44. The food monitoring system of definition 26, wherein the determined characteristic of the object comprises a nutritional characteristic of the object and wherein the system further comprises:
   an input device to receive an identity of a person who is accessing the food storage region;
   a memory storing an objective of the person relating to food consumption; and
   at least one projector, wherein the processing unit is further configured to:
   determine, based upon the identity of the person accessing the food storage region and signals from the three-dimensional sensor, prior, if any, earlier consumption of food contained in the food storage region during a predetermined time period by the person accessing the food storage region; and
   control the at least one projector to project a projection onto a surface proximate the food storage region based upon the earlier consumption of food containing the food storage region by the person accessing the food storage region during the predetermined time period and the objective of the person accessing the food storage region.

45. The food monitoring system of definition 44, wherein the determination of earlier consumption of food contained in the food storage region during the predetermined time period by the person accessing the food storage region comprises determining a quantity of earlier consumption of food associated with the object during the predetermined time period and wherein the projection is based upon the determined quantity of the earlier consumed food associated with the object and the determined food nutritional characteristic of the object.

46. The food monitoring system of definition 45, wherein the processing unit controls the at least one projector to project the projection onto the object.

47. The food monitoring system of definition 26 further comprising:
   an input device to receive an identity of a person who is accessing the food storage region;
   a memory storing an objective of the person relating to food consumption; and
   at least one projector, wherein the processing unit is further configured to:
   identify a second object within the food storage region based upon signals from the three-dimensional sensor;
   determine a characteristic of the second object, wherein the determined characteristic of the object comprises a nutritional characteristic of the object and wherein the determined characteristic of the second object comprises a nutritional characteristic of the second object and wherein the system further comprises:
   determine, prior, if any, earlier consumption of food associated with the first object during a predetermined time period by the person accessing the food storage region based upon changes in signals received from the three-dimensional sensor;
   determine, prior, if any, earlier consumption of food associated with the second object during a predetermined time period by the person accessing the food storage region based upon changes in signals received from the three-dimensional sensor; and
   control the at least one projector to project a projection onto a surface proximate the food storage region based upon the determined earlier consumption of food associated with the first object by the person accessing the food storage region during the predetermined time period, the determined earlier consumption of food associated with the second object by the person accessing the food storage region during the predetermined time period and the objective of the person accessing the food storage region.

48. The food monitoring system of definition 47, wherein the projection comprises a first projection onto the first object and wherein the processing unit controls the at least one projector to project a second projection, different than the first projection, onto the second object, the second projection being based upon the determined earlier consumption of food associated with the first object by the person accessing the food storage region during the predetermined time period, the determined earlier consumption of food associated with the second object by the person accessing the food storage region during the predetermined time period and the objective of the person accessing the food storage region.

49. The food monitoring system of definition 47, wherein the at least one projector comprises a projector that projects a projection field, wherein the projection field comprises the first projection and the second projection.

50. The food monitoring system of definition 47, wherein the at least one projector projects a projection field, wherein the processing unit maintains positioning of the projection field or relocating the first projection in the projection field in response to repositioning of the first object.

51. The food monitoring system of definition 26, wherein the processing unit is configured to determine a remaining quantity of a food item contained within the object based upon signals from the three-dimensional sensor.

52. The food monitoring system of definition 26 further comprising at least one projector, wherein the processing unit controls the at least one project to change content of a projection field of the projector based upon the determined remaining quantity of the food item contained within the object.

53. The food monitoring system of definition 26, wherein determining the characteristic of the identified object comprises automatically accessing a remote database across a network and using the identification of the object to obtain nutritional characteristics of food associated with the identified object.

54. The food monitoring system of definition 53 further comprising a projector, wherein the processing unit is configured to direct the project to project a projection onto the identified object based upon the obtained nutritional characteristics of food associated with the identified object.

55. The food monitoring system of definition 26 further comprising at least one illumination source, wherein the processing unit is configured to control the at least one illumination source to focus illumination upon the object, and not on other objects in the food storage region, based upon the identification of the object from the signals from the three-dimensional sensor.

56. The food monitoring system of definition 55, wherein the processing unit is configured to focus illumination upon the object based upon at least one criteria selected from a group of criteria consisting of: a nutritional value of food associated with the object, a residence time of the object the food storage region, an expiration date of the food associated with the object; a time of day, a day of the week, a weight gain/loss objective of a person accessing the food storage region, an allergy of a person accessing the food storage region, a food reservation for the object by a person other than the person accessing the food storage region; a determined quantity of food contained by the object, and a scheduled date for replenishment of food associated with the object.

57. The food monitoring system of definition 56, wherein the focused illumination comprises a projection.

58. A sport training system comprising:
   a three-dimensional sensor to apply a three-dimensional field measurement to a playing region of a sport;
   at least one focused illumination source; and
   a processing unit to control the at least one focused illumination source to vary application of focused illumination on the playing region based upon signals from the three-dimensional sensor.

59. The sport training system of definition 58, wherein the at least one focused illumination source comprises at least one projector and wherein the processing unit controls the at least one projector to project a projection field on the playing region, wherein the projection field is changed in response to changes in signals being received from the three-dimensional sensor.

60. The sport training system of definition 59, wherein the projection field comprises virtual player positions in the playing region and wherein the virtual player positions change in response to sensed position changes of persons in the playing region.

61. The sport training system of definition 60, wherein the projection field comprises virtual opponent player positions of a first team and recommended positioning/movement/action for a person in the playing region and using the sport training system.

62. The sport training system of definition 58, wherein the three-dimensional sensor senses a position of a person in the playing region and wherein the focused illumination indicates recommended movement of a sport projectile based upon the position of the person in the playing region.

63. The sport training system of definition 62, wherein the focused illumination illuminates a recommended path for the sport projectile.

64. The sport training system of definition 63, wherein the focused illumination additional illuminates a recommended path of movement for the person in the playing region.

65. A potty training system comprising:
   at least one projector to project a projection field relative to a toilet;
   a three-dimensional sensor to sense a three-dimensional field relative to the toilet; and
   a processing unit to control the lease one projector to adjust the projection field based upon sensed positioning of the toddler within the three-dimensional field, wherein the projection field is changed as the toddler achieves predetermined milestones towards potty training.

66. An augmented entertainment system comprising:
   a three-dimensional sensor to sense the three dimensional field encompassing at least a portion of a dining table;
   at least one projector to project a projection field onto the portion of the dining table and at least partially overlapping the three-dimensional field; and
   a processing unit to identify a food package toy within the three-dimensional field based upon signals from the three-dimensional sensor and to control the at least one projector to alter the projection field based upon the identified food package toy and its positioning within the three-dimensional field.

67. An exercise simulation builder comprising:
   a moldable medium;
   a three-dimensional sensor to sense the moldable medium; and
   a processing unit to generate terrain simulation based upon the sensed moldable medium and to generate a control script that varies an incline of an exercise apparatus based upon the generated terrain simulation.

68. A virtual game builder comprising:
   a moldable medium the moldable to form a terrain;

at least one three-dimensional sensor to sense the terrain formed by the moldable medium and to sense a person; and a processing unit to display virtual reality comprising a virtual terrain based upon the sensed terrain and a virtual character based upon the sensed person.

69. The virtual game builder of definition 68 further comprising at least one projector to project a projection onto the moldable medium forming the terrain, the processing unit to change the projection in response to changes in at least one of moldable medium and the sensed person.

70. A portable electronic device comprising:
a three-dimensional sensor;
a projector; and
a processing unit to vary the projection being projected by the projector based upon signals from three-dimensional sensor.

71. A food preparation guidance system comprising:
a three-dimensional sensor to sense a current stage of food preparation;
at least one projector to project a projection field encompassing different ingredient sources for the food preparation; and
a processing unit to control the projector to vary the projection field onto the different ingredient sources so as to prompt a preparer through use of different ingredients at different stages of the food preparation based upon signals from the three-dimensional sensor indicating the current stage of food preparation.

72. A food ordering system comprising:
at least one projector to project a menu onto a surface;
a three-dimensional sensor to sense a three-dimensional field overlying the menu on the surface; and
a processing unit to automatically forward food orders in response to sensed customer actions within the three-dimensional field and to change a projection being projected by the at least one projector in response to sensed customer actions within the three dimensional field.

73. An apparatus comprising:
a projector to project a projection field;
a three-dimensional sensor to acquire three-dimensional field measurements within the projection field;
a controller to:
recognize and distinguish between different objects within the projection field based upon the three-dimensional field measurements within the projection field;
control the projector to alter the projection field based upon the recognized objects within the projection field and their positioning within the projection field.

74. The apparatus of definition 73, wherein the controller is to control the projector to alter the projection field in response to changes in positioning of the recognize objects so as to prompt or direct manipulation of the recognized objects within the projection field.

75. The apparatus of definition 74, wherein the recognized objects comprise parts of an assembly and wherein the controller controls the projector to alter the projection field based upon sensed changes in positioning of the parts so as to instruct assembly of the assembly or disassembly of the assembly.

76. The apparatus of definition 74, wherein the recognized objects comprise ingredients to a recipe and wherein the controller controls the projector to alter the projection field based upon sensed changes in the positioning of the ingredients so as to instruct carrying out of the recipe.

77. The apparatus of claim 74, wherein the recognize objects comprise anatomical structures and/or surgical/medical tools and wherein the controller controls the projector to alter the projection field based upon changes in the anatomical structures and/or changes in positioning of the surgical/medical tools to instruct carrying out of a medical procedure on the anatomical structures.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A customer ordering system comprising:
a projector to project an image towards a horizontal surface configured to vertically underlie a food order;
a sensor to sense a three-dimensional field overlying the image on the surface; and
a processing unit to automatically forward food orders to management system, a food preparation area or to a waiter/waitress in response to sensed positioning of the arm of a customer or the sensed movement or positioning of an object or structure within the three-dimensional field and to change a projection being projected by the projector in response to sensed customer actions within the three dimensional field.

2. The customer ordering system of claim 1, wherein the processing unit is to determine a location of the customer actions and is to cause the projector to project a selection of order options based upon the determined location of the customer actions.

3. The customer ordering system of claim 1, wherein the processing unit is to identify positioning of a fluid container by a customer in the three-dimensional field, is to cause the projector to project an image identifying a fluid previously contained within the fluid container, is to sense a selection of the fluid based upon the sensed customer actions, and is to automatically forward a drink refill reorder for the fluid in response to the selection.

4. The customer ordering system of claim 3, wherein the drink refill reorder is automatically forwarded to a location distinct from the horizontal surface and proximate a dispenser of the fluid.

5. The customer ordering system of claim 1, wherein the image comprises a menu projected onto the horizontal surface.

6. The customer ordering system of claim 1, wherein the image depicts a zone on the horizontal surface and the processing unit is to automatically forward a drink request based at least in part upon an object being positioned in the zone as sensed by the sensor.

\* \* \* \* \*